US010505792B1

(12) United States Patent
Duke et al.

(10) Patent No.: US 10,505,792 B1
(45) Date of Patent: Dec. 10, 2019

(54) METHODS FOR FACILITATING NETWORK TRAFFIC ANALYTICS AND DEVICES THEREOF

(71) Applicant: F5 Networks, Inc., Seattle, WA (US)

(72) Inventors: Martin Duke, Seattle, WA (US); Saxon Amdahl, Portola Valley, CA (US)

(73) Assignee: F5 Networks, Inc., Seattle, WA (US)

( * ) Notice: Subject to any disclaimer, the term of this patent is extended or adjusted under 35 U.S.C. 154(b) by 148 days.

(21) Appl. No.: 15/721,198

(22) Filed: Sep. 29, 2017

Related U.S. Application Data

(60) Provisional application No. 62/416,214, filed on Nov. 2, 2016.

(51) Int. Cl.
*G06F 15/173* (2006.01)
*H04L 12/24* (2006.01)
(Continued)

(52) U.S. Cl.
CPC ........ *H04L 41/069* (2013.01); *H04L 41/0893* (2013.01); *H04L 41/142* (2013.01); *H04L 43/062* (2013.01); *H04L 69/16* (2013.01)

(58) Field of Classification Search
USPC ....... 709/203, 206, 217, 219, 223, 224, 226, 709/228, 230, 232, 238; 707/694;
(Continued)

(56) References Cited

U.S. PATENT DOCUMENTS

| | | | |
|---|---|---|---|
| 3,950,735 | A | 4/1976 | Patel |
| 4,644,532 | A | 2/1987 | George et al. |

(Continued)

FOREIGN PATENT DOCUMENTS

| | | |
|---|---|---|
| CA | 2080530 | 4/1994 |
| EP | 0605088 | 2/1996 |

(Continued)

OTHER PUBLICATIONS

F5 Networks Inc., "BIG-IP® Local Traffic Manager™: Implementations", Manual, May 25, 2016, pp. 1-284, vol. 12.0, F5 Networks, Inc., Retrieved from the Internet<https://support.f5.com/kb/en-us/products/big-ip_ltm/manuals/product/ltm-implementations-12-0-0.html>.

(Continued)

*Primary Examiner* — Quang N Nguyen
(74) *Attorney, Agent, or Firm* — Pepper Hamilton LLP

(57) ABSTRACT

Methods, non-transitory computer readable media, network traffic management apparatuses, and network traffic management systems that determine when an event has occurred. The event is defined in an obtained rule and is associated in the rule with a key. The key is attached to a connection associated with received network traffic that triggered the event, when the determining indicates that the event has occurred. The connection is associated with a first layer, the key comprises an input string value or corresponds to a portion of data associated with a second layer associated with the network traffic, and the second layer is different from the first layer. The connection is then monitored to obtain statistics for the connection and store or report the statistics as associated with the key.

16 Claims, 5 Drawing Sheets

(51) Int. Cl.
*H04L 29/06* (2006.01)
*H04L 12/26* (2006.01)
(58) Field of Classification Search
USPC ........................................................ 370/252
See application file for complete search history.

(56) References Cited

U.S. PATENT DOCUMENTS

| | | | |
|---|---|---|---|
| 4,897,781 | A | 1/1990 | Chang et al. |
| 4,965,772 | A | 10/1990 | Daniel et al. |
| 5,023,826 | A | 6/1991 | Patel |
| 5,053,953 | A | 10/1991 | Patel |
| 5,167,024 | A | 11/1992 | Smith et al. |
| 5,282,201 | A | 1/1994 | Frank et al. |
| 5,299,312 | A | 3/1994 | Rocco, Jr. |
| 5,327,529 | A | 7/1994 | Fults et al. |
| 5,367,635 | A | 11/1994 | Bauer et al. |
| 5,371,852 | A | 12/1994 | Attanasio et al. |
| 5,406,502 | A | 4/1995 | Haramaty et al. |
| 5,475,857 | A | 12/1995 | Daily |
| 5,517,617 | A | 5/1996 | Sathaye et al. |
| 5,519,694 | A | 5/1996 | Brewer et al. |
| 5,519,778 | A | 5/1996 | Leighton et al. |
| 5,521,591 | A | 5/1996 | Arora et al. |
| 5,528,701 | A | 6/1996 | Aref |
| 5,550,816 | A | 8/1996 | Hardwick et al. |
| 5,581,764 | A | 12/1996 | Fitzgerald et al. |
| 5,596,742 | A | 1/1997 | Agarwal et al. |
| 5,606,665 | A | 2/1997 | Yang et al. |
| 5,611,049 | A | 3/1997 | Pitts |
| 5,623,490 | A | 4/1997 | Richter et al. |
| 5,663,018 | A | 9/1997 | Cummings et al. |
| 5,752,023 | A | 5/1998 | Choucri et al. |
| 5,761,484 | A | 6/1998 | Agarwal et al. |
| 5,768,423 | A | 6/1998 | Aref et al. |
| 5,774,660 | A | 6/1998 | Brendel et al. |
| 5,790,554 | A | 8/1998 | Pitcher et al. |
| 5,802,052 | A | 9/1998 | Venkataraman |
| 5,812,550 | A | 9/1998 | Sohn et al. |
| 5,825,772 | A | 10/1998 | Dobbins et al. |
| 5,828,847 | A | 10/1998 | Gehr et al. |
| 5,832,283 | A | 11/1998 | Chou et al. |
| 5,875,296 | A | 2/1999 | Shi et al. |
| 5,892,914 | A | 4/1999 | Pitts |
| 5,892,932 | A | 4/1999 | Kim |
| 5,919,247 | A | 7/1999 | Van Hoff et al. |
| 5,936,939 | A | 8/1999 | Des Jardins et al. |
| 5,941,988 | A | 8/1999 | Bhagwat et al. |
| 5,946,690 | A | 8/1999 | Pitts |
| 5,949,885 | A | 9/1999 | Leighton |
| 5,951,694 | A | 9/1999 | Choquier et al. |
| 5,959,990 | A | 9/1999 | Frantz et al. |
| 5,974,460 | A | 10/1999 | Maddalozzo, Jr. et al. |
| 5,983,281 | A | 11/1999 | Ogle et al. |
| 5,987,523 | A | 11/1999 | Hind et al. |
| 5,988,847 | A | 11/1999 | McLaughlin et al. |
| 5,991,302 | A | 11/1999 | Berl et al. |
| 5,995,491 | A | 11/1999 | Richter et al. |
| 6,006,260 | A | 12/1999 | Barrick, Jr. et al. |
| 6,006,264 | A | 12/1999 | Colby et al. |
| 6,026,452 | A | 2/2000 | Pitts |
| 6,026,500 | A | 2/2000 | Topff et al. |
| 6,028,857 | A | 2/2000 | Poor |
| 6,029,175 | A | 2/2000 | Chow et al. |
| 6,041,365 | A | 3/2000 | Kleinerman |
| 6,047,356 | A | 4/2000 | Anderson et al. |
| 6,051,169 | A | 4/2000 | Brown et al. |
| 6,064,671 | A | 5/2000 | Killian |
| 6,067,558 | A | 5/2000 | Wendt et al. |
| 6,078,956 | A | 6/2000 | Bryant et al. |
| 6,085,234 | A | 7/2000 | Pitts et al. |
| 6,092,196 | A | 7/2000 | Reiche |
| 6,104,706 | A | 8/2000 | Richter et al. |
| 6,108,703 | A | 8/2000 | Leighton et al. |
| 6,111,876 | A | 8/2000 | Frantz et al. |
| 6,128,279 | A | 10/2000 | O'Neil et al. |
| 6,128,657 | A | 10/2000 | Okanoya et al. |
| 6,154,777 | A | 11/2000 | Ebrahim |
| 6,157,950 | A | 12/2000 | Krishnan |
| 6,160,874 | A | 12/2000 | Dickerman et al. |
| 6,170,022 | B1 | 1/2001 | Linville et al. |
| 6,178,423 | B1 | 1/2001 | Douceur et al. |
| 6,182,139 | B1 | 1/2001 | Brendel |
| 6,185,619 | B1 | 2/2001 | Joffe et al. |
| 6,192,051 | B1 | 2/2001 | Lipman et al. |
| 6,233,612 | B1 | 5/2001 | Fruchtman et al. |
| 6,246,684 | B1 | 6/2001 | Chapman et al. |
| 6,253,226 | B1 | 6/2001 | Chidambaran et al. |
| 6,253,230 | B1 | 6/2001 | Couland et al. |
| 6,259,405 | B1 | 7/2001 | Stewart et al. |
| 6,260,070 | B1 | 7/2001 | Shah |
| 6,263,368 | B1 | 7/2001 | Martin |
| 6,289,012 | B1 | 9/2001 | Harrington et al. |
| 6,292,832 | B1 | 9/2001 | Shah et al. |
| 6,298,380 | B1 | 10/2001 | Coile et al. |
| 6,304,913 | B1 | 10/2001 | Rune |
| 6,327,622 | B1 | 12/2001 | Jindal et al. |
| 6,330,574 | B1 | 12/2001 | Murashita |
| 6,338,082 | B1 | 1/2002 | Schneider |
| 6,343,324 | B1 | 1/2002 | Hubis et al. |
| 6,347,339 | B1 | 2/2002 | Morris et al. |
| 6,353,848 | B1 | 3/2002 | Morris |
| 6,356,541 | B1 | 3/2002 | Muller et al. |
| 6,360,270 | B1 | 3/2002 | Cherkasova et al. |
| 6,363,056 | B1 | 3/2002 | Beigi et al. |
| 6,370,527 | B1 | 4/2002 | Singhal |
| 6,374,300 | B2 | 4/2002 | Masters |
| 6,389,462 | B1 | 5/2002 | Cohen et al. |
| 6,396,833 | B1 | 5/2002 | Zhang et al. |
| 6,411,986 | B1 | 6/2002 | Susai et al. |
| 6,430,562 | B1 | 8/2002 | Kardos et al. |
| 6,434,081 | B1 | 8/2002 | Johnson et al. |
| 6,446,108 | B1 | 9/2002 | Rosenberg et al. |
| 6,466,580 | B1 | 10/2002 | Leung |
| 6,469,983 | B2 | 10/2002 | Narayana et al. |
| 6,480,476 | B1 | 11/2002 | Willars |
| 6,484,261 | B1 | 11/2002 | Wiegel |
| 6,490,624 | B1 | 12/2002 | Sampson et al. |
| 6,510,135 | B1 | 1/2003 | Almulhem et al. |
| 6,510,458 | B1 | 1/2003 | Berstis et al. |
| 6,513,061 | B1 | 1/2003 | Ebata et al. |
| 6,514,085 | B2 | 2/2003 | Slattery et al. |
| 6,519,643 | B1 | 2/2003 | Foulkes et al. |
| 6,542,936 | B1 | 4/2003 | Mayle et al. |
| 6,560,230 | B1 | 5/2003 | Li et al. |
| 6,578,069 | B1 | 6/2003 | Hopmann et al. |
| 6,601,084 | B1 | 7/2003 | Bhaskaran et al. |
| 6,606,744 | B1 | 8/2003 | Mikurak |
| 6,615,267 | B1 | 9/2003 | Whalen et al. |
| 6,631,422 | B1 | 10/2003 | Althaus et al. |
| 6,636,502 | B1 | 10/2003 | Shiran et al. |
| 6,636,894 | B1 | 10/2003 | Short et al. |
| 6,650,640 | B1 | 11/2003 | Muller et al. |
| 6,650,641 | B1 | 11/2003 | Albert et al. |
| 6,654,346 | B1 | 11/2003 | Mahalingaiah et al. |
| 6,654,701 | B2 | 11/2003 | Hailey |
| 6,661,802 | B1 | 12/2003 | Homberg et al. |
| 6,671,818 | B1 | 12/2003 | Mikurak |
| 6,683,873 | B1 | 1/2004 | Kwok et al. |
| 6,691,165 | B1 | 2/2004 | Bruck et al. |
| 6,694,517 | B1 | 2/2004 | James et al. |
| 6,701,415 | B1 | 3/2004 | Hendren, III |
| 6,708,187 | B1 | 3/2004 | Shanumgam et al. |
| 6,708,220 | B1 | 3/2004 | Olin |
| 6,718,380 | B1 | 4/2004 | Mohaban et al. |
| 6,728,704 | B2 | 4/2004 | Mao et al. |
| 6,738,357 | B1 | 5/2004 | Richter et al. |
| 6,742,045 | B1 | 5/2004 | Albert et al. |
| 6,744,776 | B1 | 6/2004 | Kalkunte et al. |
| 6,748,416 | B2 | 6/2004 | Carpenter et al. |
| 6,751,663 | B1 | 6/2004 | Farrell et al. |
| 6,754,215 | B1 | 6/2004 | Arikawa et al. |
| 6,754,228 | B1 | 6/2004 | Ludwig |
| 6,754,699 | B2 | 6/2004 | Swildens et al. |

(56) References Cited

U.S. PATENT DOCUMENTS 6,760,337 B1 7/2004 Snyder, II et al.
6,760,775 B1 7/2004 Anerousis et al.
6,772,219 B1 8/2004 Shobatake
6,779,039 B1 8/2004 Bommareddy et al.
6,781,986 B1 8/2004 Sabaa et al.
6,795,860 B1 9/2004 Shah
6,798,777 B1 9/2004 Ferguson et al.
6,804,542 B1 10/2004 Haartsen
6,816,901 B1 11/2004 Sitaraman et al.
6,816,977 B2 11/2004 Brakmo et al.
6,826,698 B1 11/2004 Minkin et al.
6,829,238 B2 12/2004 Tokuyo et al.
6,857,009 B1 2/2005 Ferreria
6,862,282 B1 3/2005 Oden
6,865,593 B1 3/2005 Reshef et al.
6,868,082 B1 3/2005 Allen, Jr. et al.
6,868,447 B1 3/2005 Slaughter et al.
6,871,221 B1 3/2005 Styles
6,876,629 B2 4/2005 Beshai et al.
6,876,654 B1 4/2005 Hegde
6,880,017 B1 4/2005 Marce et al.
6,883,137 B1 4/2005 Girardot et al.
6,888,836 B1 5/2005 Cherkasova
6,904,040 B2 6/2005 Salapura et al.
6,914,881 B1 7/2005 Mansfield et al.
6,928,082 B2 8/2005 Liu et al.
6,928,518 B2 8/2005 Talagala
6,947,985 B2 9/2005 Hegli et al.
6,950,434 B1 9/2005 Viswanath et al.
6,954,780 B2 10/2005 Susai et al.
6,957,272 B2 10/2005 Tallegas et al.
6,959,394 B1 10/2005 Brickell et al.
6,970,475 B1 11/2005 Fraser et al.
6,970,924 B1 11/2005 Chu et al.
6,973,490 B1 12/2005 Robertson et al.
6,975,592 B1 12/2005 Seddigh et al.
6,986,040 B1 1/2006 Kramer et al.
6,987,763 B2 1/2006 Rochberger et al.
6,990,074 B2 1/2006 Wan et al.
6,990,114 B1 1/2006 Erimli et al.
7,003,564 B2 2/2006 Greuel et al.
7,006,502 B2 2/2006 Lin
7,007,092 B2 2/2006 Peiffer
7,020,713 B1 3/2006 Shah et al.
7,023,974 B1 4/2006 Brannam et al.
7,035,212 B1 4/2006 Mittal et al.
7,039,061 B2 5/2006 Connor et al.
7,058,633 B1 6/2006 Gnagy et al.
7,065,482 B2 6/2006 Shorey et al.
7,075,924 B2 7/2006 Richter et al.
7,076,689 B2 7/2006 Atkinson
7,080,314 B1 7/2006 Garofalakis et al.
7,089,491 B2 8/2006 Feinberg et al.
7,099,277 B2 8/2006 Sahinoglu et al.
7,113,993 B1 9/2006 Cappiello et al.
7,113,996 B2 9/2006 Kronenberg
7,133,863 B2 11/2006 Teng et al.
7,133,944 B2 11/2006 Song et al.
7,139,792 B1 11/2006 Mishra et al.
7,161,904 B2 1/2007 Hussain et al.
7,185,359 B2 2/2007 Schmidt et al.
7,191,163 B2 3/2007 Herrera et al.
7,228,359 B1 6/2007 Monteiro
7,228,422 B2 6/2007 Morioka et al.
7,236,491 B2 6/2007 Tsao et al.
7,240,100 B1 7/2007 Wein et al.
7,257,633 B2 8/2007 Masputra et al.
7,287,082 B1 10/2007 O'Toole, Jr.
7,292,541 B1 11/2007 C S
7,295,827 B2 11/2007 Liu et al.
7,296,263 B1 11/2007 Jacob
7,308,475 B1 12/2007 Pruitt et al.
7,308,703 B2 12/2007 Wright et al.
7,308,709 B1 12/2007 Brezak et al.
7,310,339 B1 12/2007 Powers et al.
7,319,696 B2 1/2008 Inoue et al.
7,321,926 B1 1/2008 Zhang et al.
7,324,533 B1 1/2008 DeLiberato et al.
7,333,999 B1 2/2008 Njemanze
7,340,571 B2 3/2008 Saze
7,343,413 B2 3/2008 Gilde et al.
7,349,391 B2 3/2008 Ben-Dor et al.
7,373,438 B1 5/2008 DeBergalis et al.
7,383,570 B2 6/2008 Pinkas et al.
7,398,552 B2 7/2008 Pardee et al.
7,409,440 B1 8/2008 Jacob
7,433,962 B2 10/2008 Janssen et al.
7,437,478 B2 10/2008 Yokota et al.
7,454,480 B2 11/2008 Labia et al.
7,490,162 B1 2/2009 Masters
7,500,269 B2 3/2009 Huotari et al.
7,505,795 B1 3/2009 Lim et al.
7,516,492 B1 4/2009 Nisbet et al.
7,522,581 B2 4/2009 Acharya et al.
7,526,541 B2 4/2009 Roese et al.
7,555,608 B2 6/2009 Naik et al.
7,558,197 B1 7/2009 Sindhu et al.
7,577,723 B2 8/2009 Matsuda et al.
7,580,971 B1 8/2009 Gollapudi et al.
7,590,732 B2 9/2009 Rune
7,624,424 B2 11/2009 Morita et al.
7,640,347 B1 12/2009 Sloat et al.
7,644,137 B2 1/2010 Bozak et al.
7,668,166 B1 2/2010 Rekhter et al.
7,680,915 B2 3/2010 Still et al.
7,684,423 B2 3/2010 Tripathi et al.
7,689,710 B2 3/2010 Tang et al.
7,698,458 B1 4/2010 Liu et al.
7,716,077 B1 5/2010 Mikurak
7,725,093 B2 5/2010 Sengupta et al.
7,725,657 B2 5/2010 Hasenplaugh et al.
7,778,187 B2 8/2010 Chaturvedi et al.
7,801,978 B1 9/2010 Susai et al.
7,808,913 B2 10/2010 Ansari et al.
7,822,839 B1 10/2010 Pruitt et al.
7,831,662 B2 11/2010 Clark et al.
7,861,085 B1 12/2010 Case et al.
7,895,653 B2 2/2011 Calo et al.
7,903,554 B1 3/2011 Manur et al.
7,908,245 B2 3/2011 Nakano et al.
7,908,314 B2 3/2011 Yamaguchi et al.
7,925,908 B2 4/2011 Kim
7,930,365 B2 4/2011 Dixit et al.
7,933,946 B2 4/2011 Livshits et al.
7,945,908 B1 5/2011 Waldspurger et al.
7,957,991 B2 6/2011 Mikurak
7,958,222 B1 6/2011 Pruitt et al.
7,984,141 B2 7/2011 Gupta et al.
7,984,500 B1 7/2011 Khanna et al.
8,024,443 B1 9/2011 Jacob
8,032,409 B1 10/2011 Mikurak
8,037,528 B2 10/2011 Williams et al.
8,041,022 B1 10/2011 Andreasen et al.
8,064,342 B2 11/2011 Badger
8,069,225 B2 11/2011 McCann et al.
8,103,781 B1 1/2012 Wu et al.
8,130,650 B2 3/2012 Allen, Jr. et al.
8,149,819 B2 4/2012 Kobayashi et al.
8,155,128 B2 4/2012 Balyan et al.
8,170,055 B2 5/2012 Fang et al.
8,171,124 B2 5/2012 Kondamuru
8,189,567 B2 5/2012 Kavanagh et al.
8,190,769 B1 5/2012 Shukla et al.
8,199,757 B2 6/2012 Pani et al.
8,205,246 B2 6/2012 Shatzkamer et al.
8,218,572 B2 7/2012 Moran et al.
8,239,954 B2 8/2012 Wobber et al.
8,271,620 B2 9/2012 Witchey
8,274,895 B2 9/2012 Rahman et al.
8,321,908 B2 11/2012 Gai et al.
8,351,333 B2 1/2013 Rao et al.
8,380,854 B2 2/2013 Szabo
8,396,836 B1 3/2013 Ferguson et al.
8,417,817 B1 4/2013 Jacobs

(56) References Cited

U.S. PATENT DOCUMENTS 8,447,871 B1 5/2013 Szabo
8,447,970 B2 5/2013 Klein et al.
8,452,876 B1 5/2013 Williams et al.
8,463,850 B1 6/2013 McCann
8,464,265 B2 6/2013 Worley
8,468,247 B1 6/2013 Richardson et al.
8,468,267 B2 6/2013 Yigang
8,484,348 B2 7/2013 Subramanian et al.
8,521,851 B1 8/2013 Richardson et al.
8,521,880 B1 8/2013 Richardson et al.
8,539,224 B2 9/2013 Henderson et al.
8,560,693 B1 10/2013 Wang et al.
8,566,474 B2 10/2013 Kanode et al.
8,578,050 B2 11/2013 Craig et al.
8,601,000 B1 12/2013 Stefani et al.
8,606,921 B2 12/2013 Vasquez et al.
8,615,022 B2 12/2013 Harrison et al.
8,646,067 B2 2/2014 Agarwal et al.
8,665,969 B2 3/2014 Kay
8,701,179 B1 4/2014 Penno et al.
8,725,836 B2 5/2014 Lowery et al.
8,726,338 B2 5/2014 Narayanaswamy et al.
8,737,304 B2 5/2014 Karuturi et al.
8,769,127 B2 * 7/2014 Selimis .................. H04L 67/06 709/223
8,778,665 B2 7/2014 Gilde et al.
8,804,504 B1 8/2014 Chen
8,819,109 B1 8/2014 Krishnamurthy et al.
8,819,419 B2 8/2014 Carlson et al.
8,830,874 B2 9/2014 Cho et al.
8,838,817 B1 9/2014 Biswas
8,873,753 B2 10/2014 Parker
8,875,274 B2 10/2014 Montemurro et al.
8,879,431 B2 11/2014 Ridel et al.
8,886,981 B1 11/2014 Baumann et al.
8,908,545 B1 12/2014 Chen et al.
8,954,080 B2 2/2015 Janakiriman et al.
8,958,306 B2 2/2015 McCann et al.
8,959,215 B2 2/2015 Koponen et al.
9,036,529 B2 5/2015 Erickson et al.
9,037,166 B2 5/2015 de Wit et al.
9,047,259 B1 6/2015 Ho et al.
9,077,554 B1 7/2015 Szabo
9,083,760 B1 7/2015 Hughes et al.
9,135,093 B2 * 9/2015 Boller ..................... G06F 9/542
9,143,451 B2 9/2015 Amdahl et al.
9,146,962 B1 * 9/2015 Boe ..................... G06F 16/2228
9,210,056 B1 * 12/2015 Choudhary ........... G06F 16/284
9,244,843 B1 1/2016 Michels et al.
9,578,126 B1 2/2017 Kirti et al.
2001/0007560 A1 7/2001 Masuda et al.
2001/0009554 A1 7/2001 Katseff et al.
2001/0023442 A1 9/2001 Masters
2001/0053694 A1 12/2001 Igarashi
2002/0002502 A1 1/2002 Maes
2002/0010757 A1 1/2002 Granik et al.
2002/0010783 A1 1/2002 Primak et al.
2002/0012352 A1 1/2002 Hansson et al.
2002/0032777 A1 3/2002 Kawata et al.
2002/0038360 A1 3/2002 Andrews et al.
2002/0046291 A1 4/2002 O'Callaghan et al.
2002/0049842 A1 4/2002 Huetsch et al.
2002/0065848 A1 5/2002 Walker
2002/0072048 A1 6/2002 Slattery et al.
2002/0080752 A1 6/2002 Johansson et al.
2002/0083067 A1 6/2002 Tamayo et al.
2002/0087571 A1 7/2002 Stapel et al.
2002/0087744 A1 7/2002 Kitchin
2002/0095498 A1 7/2002 Chanda et al.
2002/0099829 A1 7/2002 Richards et al.
2002/0099842 A1 7/2002 Jennings et al.
2002/0103823 A1 8/2002 Jackson et al.
2002/0112061 A1 8/2002 Shih et al.
2002/0138615 A1 9/2002 Schmeling
2002/0143819 A1 10/2002 Han et al.
2002/0143852 A1 10/2002 Guo et al.
2002/0161913 A1 10/2002 Gonzalez et al.
2002/0162118 A1 10/2002 Levy et al.
2002/0174216 A1 11/2002 Shorey et al.
2002/0194112 A1 12/2002 DePinto et al.
2002/0194342 A1 12/2002 Lu et al.
2002/0198956 A1 12/2002 Dunshea et al.
2002/0198993 A1 12/2002 Cudd et al.
2003/0005172 A1 1/2003 Chessell
2003/0009528 A1 1/2003 Shard et al.
2003/0018450 A1 1/2003 Carley
2003/0018585 A1 1/2003 Butler et al.
2003/0034905 A1 2/2003 Anton et al.
2003/0037070 A1 2/2003 Marston
2003/0046291 A1 3/2003 Fascenda
2003/0051045 A1 3/2003 Connor
2003/0055723 A1 3/2003 English
2003/0065653 A1 4/2003 Overton et al.
2003/0065951 A1 4/2003 Igeta
2003/0069918 A1 4/2003 Lu et al.
2003/0069974 A1 4/2003 Lu et al.
2003/0070069 A1 4/2003 Belapurkar et al.
2003/0074301 A1 4/2003 Solomon
2003/0086415 A1 5/2003 Bernhard et al.
2003/0105807 A1 6/2003 Thompson et al.
2003/0105846 A1 6/2003 Zhao et al.
2003/0105983 A1 6/2003 Brakmo et al.
2003/0108000 A1 6/2003 Chaney et al.
2003/0108002 A1 6/2003 Chaney et al.
2003/0108052 A1 6/2003 Inoue
2003/0120948 A1 6/2003 Schmidt et al.
2003/0126200 A1 7/2003 Wolff
2003/0128708 A1 7/2003 Inoue et al.
2003/0130945 A1 7/2003 Force
2003/0139934 A1 7/2003 Mandera
2003/0145062 A1 7/2003 Sharma et al.
2003/0145233 A1 7/2003 Poletto et al.
2003/0156586 A1 8/2003 Lee et al.
2003/0163576 A1 8/2003 Janssen et al.
2003/0179755 A1 9/2003 Fraser
2003/0189936 A1 10/2003 Terrell et al.
2003/0191812 A1 10/2003 Agarwalla et al.
2003/0195813 A1 10/2003 Pallister et al.
2003/0195962 A1 10/2003 Kikuchi et al.
2003/0195984 A1 10/2003 Zisapel et al.
2003/0208596 A1 11/2003 Carolan et al.
2003/0212954 A1 11/2003 Patrudu
2003/0220835 A1 11/2003 Barnes, Jr.
2003/0225485 A1 12/2003 Fritz et al.
2003/0229665 A1 12/2003 Ryman
2003/0236995 A1 12/2003 Fretwell, Jr.
2004/0003287 A1 1/2004 Zissimopoulos et al.
2004/0006591 A1 1/2004 Matsui et al.
2004/0015783 A1 1/2004 Lennon et al.
2004/0017825 A1 1/2004 Stanwood et al.
2004/0030627 A1 2/2004 Sedukhin
2004/0030740 A1 2/2004 Stelting
2004/0043758 A1 3/2004 Sorvari et al.
2004/0059789 A1 3/2004 Shum
2004/0064544 A1 4/2004 Barsness et al.
2004/0064554 A1 4/2004 Kuno et al.
2004/0072569 A1 4/2004 Omae et al.
2004/0093361 A1 5/2004 Therrien et al.
2004/0103283 A1 5/2004 Hornak
2004/0111523 A1 6/2004 Hall et al.
2004/0111621 A1 6/2004 Himberger et al.
2004/0117493 A1 6/2004 Bazot et al.
2004/0122926 A1 6/2004 Moore et al.
2004/0123277 A1 6/2004 Schrader et al.
2004/0133605 A1 7/2004 Chang et al.
2004/0138858 A1 7/2004 Carley
2004/0141185 A1 8/2004 Akama
2004/0151186 A1 8/2004 Akama
2004/0162058 A1 8/2004 Mottes
2004/0167967 A1 8/2004 Bastian et al.
2004/0177165 A1 9/2004 Masputra et al.
2004/0192312 A1 9/2004 Li et al.
2004/0199762 A1 10/2004 Carlson et al.
2004/0210663 A1 10/2004 Phillips et al.

(56) References Cited

U.S. PATENT DOCUMENTS

| | | | |
|---|---|---|---|
| 2004/0213156 | A1 | 10/2004 | Smallwood et al. |
| 2004/0215665 | A1 | 10/2004 | Edgar et al. |
| 2004/0236826 | A1 | 11/2004 | Harville et al. |
| 2004/0255000 | A1 | 12/2004 | Simionescu et al. |
| 2004/0264472 | A1 | 12/2004 | Oliver et al. |
| 2004/0264481 | A1 | 12/2004 | Darling et al. |
| 2004/0267920 | A1 | 12/2004 | Hydrie et al. |
| 2004/0267948 | A1 | 12/2004 | Oliver et al. |
| 2004/0268358 | A1 | 12/2004 | Darling et al. |
| 2005/0004887 | A1 | 1/2005 | Igakura et al. |
| 2005/0008017 | A1 | 1/2005 | Dana et al. |
| 2005/0021703 | A1 | 1/2005 | Cherry et al. |
| 2005/0021736 | A1 | 1/2005 | Carusi et al. |
| 2005/0027841 | A1 | 2/2005 | Rolfe |
| 2005/0027869 | A1 | 2/2005 | Johnson |
| 2005/0044158 | A1 | 2/2005 | Malik |
| 2005/0044213 | A1 | 2/2005 | Kobayashi et al. |
| 2005/0052440 | A1 | 3/2005 | Kim et al. |
| 2005/0055435 | A1 | 3/2005 | Gbadegesin et al. |
| 2005/0071283 | A1 | 3/2005 | Randle et al. |
| 2005/0078604 | A1 | 4/2005 | Yim |
| 2005/0117589 | A1 | 6/2005 | Douady et al. |
| 2005/0122942 | A1 | 6/2005 | Rhee et al. |
| 2005/0122977 | A1 | 6/2005 | Lieberman |
| 2005/0154837 | A1 | 7/2005 | Keohane et al. |
| 2005/0165656 | A1 | 7/2005 | Frederick et al. |
| 2005/0174944 | A1 | 8/2005 | Legault et al. |
| 2005/0175013 | A1 | 8/2005 | Le Pennec et al. |
| 2005/0187866 | A1 | 8/2005 | Lee |
| 2005/0188220 | A1 | 8/2005 | Nisson et al. |
| 2005/0198234 | A1 | 9/2005 | Leib et al. |
| 2005/0198310 | A1 | 9/2005 | Kim et al. |
| 2005/0213587 | A1 | 9/2005 | Cho et al. |
| 2005/0234928 | A1 | 10/2005 | Shkvarchuk et al. |
| 2005/0240664 | A1 | 10/2005 | Chen et al. |
| 2005/0256806 | A1 | 11/2005 | Tien et al. |
| 2005/0259631 | A1 | 11/2005 | Rajahalme |
| 2005/0262238 | A1 | 11/2005 | Reeves et al. |
| 2005/0273456 | A1 | 12/2005 | Revanuru et al. |
| 2005/0288939 | A1 | 12/2005 | Peled et al. |
| 2006/0031374 | A1 | 2/2006 | Lu et al. |
| 2006/0031384 | A1 | 2/2006 | Manders et al. |
| 2006/0031520 | A1 | 2/2006 | Bedekar et al. |
| 2006/0031778 | A1 | 2/2006 | Goodwin et al. |
| 2006/0036764 | A1 | 2/2006 | Yokota et al. |
| 2006/0045089 | A1 | 3/2006 | Bacher et al. |
| 2006/0045096 | A1 | 3/2006 | Farmer et al. |
| 2006/0047785 | A1 | 3/2006 | Wang et al. |
| 2006/0059267 | A1 | 3/2006 | Cugi et al. |
| 2006/0077902 | A1 | 4/2006 | Kannan et al. |
| 2006/0077986 | A1 | 4/2006 | Rune |
| 2006/0083205 | A1 | 4/2006 | Buddhikot et al. |
| 2006/0095573 | A1 | 5/2006 | Carle et al. |
| 2006/0100752 | A1 | 5/2006 | Kim et al. |
| 2006/0106802 | A1 | 5/2006 | Giblin et al. |
| 2006/0111113 | A1 | 5/2006 | Waris |
| 2006/0112176 | A1 | 5/2006 | Liu et al. |
| 2006/0112272 | A1 | 5/2006 | Morioka et al. |
| 2006/0112367 | A1 | 5/2006 | Harris |
| 2006/0123210 | A1 | 6/2006 | Pritchett et al. |
| 2006/0129684 | A1 | 6/2006 | Datta |
| 2006/0130133 | A1 | 6/2006 | Andreev et al. |
| 2006/0133374 | A1 | 6/2006 | Sekiguchi |
| 2006/0135198 | A1 | 6/2006 | Lee |
| 2006/0136519 | A1 | 6/2006 | Batta |
| 2006/0140193 | A1 | 6/2006 | Kakani et al. |
| 2006/0153201 | A1 | 7/2006 | Hepper et al. |
| 2006/0156416 | A1 | 7/2006 | Huotari et al. |
| 2006/0161577 | A1 | 7/2006 | Kulkarni et al. |
| 2006/0168070 | A1 | 7/2006 | Thompson et al. |
| 2006/0168154 | A1 | 7/2006 | Zhang et al. |
| 2006/0171365 | A1 | 8/2006 | Borella |
| 2006/0179153 | A1 | 8/2006 | Lee et al. |
| 2006/0182103 | A1 | 8/2006 | Martini et al. |
| 2006/0184647 | A1 | 8/2006 | Dixit et al. |
| 2006/0209669 | A1 | 9/2006 | Nishio |
| 2006/0209853 | A1 | 9/2006 | Hidaka et al. |
| 2006/0229861 | A1 | 10/2006 | Tatsuoka et al. |
| 2006/0230148 | A1 | 10/2006 | Forecast et al. |
| 2006/0233106 | A1 | 10/2006 | Achlioptas et al. |
| 2006/0235998 | A1 | 10/2006 | Stecher et al. |
| 2006/0242300 | A1 | 10/2006 | Yumoto et al. |
| 2006/0259320 | A1 | 11/2006 | LaSalle et al. |
| 2006/0268692 | A1 | 11/2006 | Wright et al. |
| 2006/0268704 | A1 | 11/2006 | Ansari et al. |
| 2006/0268893 | A1 | 11/2006 | Lataretu |
| 2006/0270341 | A1 | 11/2006 | Kim et al. |
| 2006/0282442 | A1 | 12/2006 | Lennon et al. |
| 2006/0291483 | A1 | 12/2006 | Seta |
| 2006/0294054 | A1 | 12/2006 | Kudo et al. |
| 2007/0005807 | A1 | 1/2007 | Wong |
| 2007/0006293 | A1 | 1/2007 | Balakrishnan et al. |
| 2007/0016613 | A1 | 1/2007 | Foresti et al. |
| 2007/0016662 | A1 | 1/2007 | Desai |
| 2007/0019636 | A1 | 1/2007 | Lau et al. |
| 2007/0019658 | A1 | 1/2007 | Park et al. |
| 2007/0038994 | A1 | 2/2007 | Davis et al. |
| 2007/0297410 | A1 | 2/2007 | Yoon et al. |
| 2007/0050843 | A1 | 3/2007 | Manville et al. |
| 2007/0058670 | A1 | 3/2007 | Konduru et al. |
| 2007/0064661 | A1 | 3/2007 | Sood et al. |
| 2007/0067373 | A1 | 3/2007 | Higgins et al. |
| 2007/0067771 | A1 | 3/2007 | Kulbak et al. |
| 2007/0083646 | A1 | 4/2007 | Miller et al. |
| 2007/0086335 | A1 | 4/2007 | McCanne et al. |
| 2007/0088822 | A1 | 4/2007 | Coile et al. |
| 2007/0106796 | A1 | 5/2007 | Kudo et al. |
| 2007/0107048 | A1 | 5/2007 | Halls et al. |
| 2007/0110043 | A1 | 5/2007 | Girard |
| 2007/0112775 | A1 | 5/2007 | Ackerman |
| 2007/0118879 | A1 | 5/2007 | Yeun |
| 2007/0124415 | A1 | 5/2007 | Lev-Ran et al. |
| 2007/0124502 | A1 | 5/2007 | Li |
| 2007/0130255 | A1 | 6/2007 | Wolovitz et al. |
| 2007/0147246 | A1 | 6/2007 | Hurley et al. |
| 2007/0162891 | A1 | 7/2007 | Burner et al. |
| 2007/0168320 | A1 | 7/2007 | Borthakur et al. |
| 2007/0168525 | A1 | 7/2007 | DeLeon et al. |
| 2007/0192543 | A1 | 8/2007 | Naik et al. |
| 2007/0220598 | A1 | 9/2007 | Salowey |
| 2007/0233809 | A1 | 10/2007 | Brownell et al. |
| 2007/0233826 | A1 | 10/2007 | Tindal et al. |
| 2007/0250560 | A1 | 10/2007 | Wein et al. |
| 2007/0258451 | A1 | 11/2007 | Bouat |
| 2007/0297551 | A1 | 12/2007 | Choi |
| 2008/0004022 | A1 | 1/2008 | Johannesson et al. |
| 2008/0008202 | A1 | 1/2008 | Terrell et al. |
| 2008/0010372 | A1 | 1/2008 | Khedouri et al. |
| 2008/0022059 | A1 | 1/2008 | Zimmerer et al. |
| 2008/0025297 | A1 | 1/2008 | Kashyap |
| 2008/0031258 | A1 | 2/2008 | Acharya et al. |
| 2008/0034136 | A1 | 2/2008 | Ulenas |
| 2008/0072303 | A1 | 3/2008 | Syed |
| 2008/0120370 | A1 | 5/2008 | Chan et al. |
| 2008/0120592 | A1 | 5/2008 | Tanguay et al. |
| 2008/0133518 | A1 | 6/2008 | Kapoor et al. |
| 2008/0134311 | A1 | 6/2008 | Medvinsky et al. |
| 2008/0141246 | A1 | 6/2008 | Kuck et al. |
| 2008/0148340 | A1 | 6/2008 | Powell et al. |
| 2008/0151860 | A1 | 6/2008 | Sakoda et al. |
| 2008/0151931 | A1 | 6/2008 | Moran et al. |
| 2008/0159145 | A1 | 7/2008 | Muthukrishnan et al. |
| 2008/0165801 | A1 | 7/2008 | Sheppard |
| 2008/0178278 | A1 | 7/2008 | Grinstein et al. |
| 2008/0192770 | A1 | 8/2008 | Burrows et al. |
| 2008/0201599 | A1 | 8/2008 | Ferraiolo et al. |
| 2008/0205613 | A1 | 8/2008 | Lopez |
| 2008/0208917 | A1 | 8/2008 | Smoot et al. |
| 2008/0222646 | A1 | 9/2008 | Sigal et al. |
| 2008/0225710 | A1 | 9/2008 | Raja et al. |
| 2008/0229415 | A1 | 9/2008 | Kapoor et al. |
| 2008/0235508 | A1 | 9/2008 | Ran et al. |
| 2008/0239986 | A1 | 10/2008 | Xu et al. |
| 2008/0253395 | A1 | 10/2008 | Pandya |

(56) References Cited

U.S. PATENT DOCUMENTS

2008/0256224 A1 10/2008 Kaji et al.
2008/0263401 A1 10/2008 Stenzel
2008/0270578 A1 10/2008 Zhang et al.
2008/0279200 A1 11/2008 Shatzkamer et al.
2008/0281908 A1 11/2008 McCanne et al.
2008/0281944 A1 11/2008 Vorne et al.
2008/0282354 A1 11/2008 Wobber et al.
2008/0288661 A1 11/2008 Galles
2008/0301760 A1 12/2008 Lim
2008/0316922 A1 12/2008 Riddle et al.
2009/0028337 A1 1/2009 Balabine et al.
2009/0049230 A1 2/2009 Pandya
2009/0052379 A1 2/2009 Suh
2009/0070617 A1 3/2009 Arimilli et al.
2009/0077619 A1 3/2009 Boyce
2009/0080440 A1 3/2009 Balyan et al.
2009/0089487 A1 4/2009 Kwon et al.
2009/0094311 A1 4/2009 Awadallah et al.
2009/0094610 A1 4/2009 Sukirya
2009/0097480 A1 4/2009 Curtis et al.
2009/0106413 A1 4/2009 Salo et al.
2009/0119504 A1 5/2009 Van Os et al.
2009/0124525 A1 5/2009 Shim et al.
2009/0125496 A1 5/2009 Wexler et al.
2009/0125532 A1 5/2009 Wexler et al.
2009/0125955 A1 5/2009 DeLorme
2009/0138314 A1 5/2009 Bruce
2009/0138749 A1 5/2009 Moll et al.
2009/0141891 A1 6/2009 Boyen et al.
2009/0156204 A1 6/2009 Kim
2009/0157678 A1 6/2009 Turk
2009/0161542 A1 6/2009 Ho
2009/0187915 A1 7/2009 Chew et al.
2009/0193126 A1 7/2009 Agarwal et al.
2009/0193513 A1 7/2009 Agarwal et al.
2009/0196282 A1 8/2009 Fellman et al.
2009/0217163 A1 8/2009 Jaroker
2009/0217386 A1 8/2009 Schneider
2009/0228956 A1 9/2009 He et al.
2009/0241176 A1 9/2009 Beletski et al.
2009/0248893 A1 10/2009 Richardson et al.
2009/0265396 A1 10/2009 Ram et al.
2009/0265467 A1 10/2009 Peles
2009/0287935 A1 11/2009 Aull et al.
2009/0289828 A1 11/2009 Hinchey
2009/0292957 A1 11/2009 Bower et al.
2009/0296624 A1 12/2009 Ryu et al.
2009/0300161 A1 12/2009 Pruitt et al.
2009/0300407 A1 12/2009 Kamath et al.
2009/0316708 A1 12/2009 Yahyaoui et al.
2009/0319600 A1 12/2009 Sedan et al.
2010/0011434 A1 1/2010 Kay
2010/0017846 A1 1/2010 Huang et al.
2010/0023582 A1 1/2010 Pedersen et al.
2010/0039937 A1 2/2010 Ramanujan et al.
2010/0042743 A1 2/2010 Jeon et al.
2010/0061232 A1 3/2010 Zhou et al.
2010/0064001 A1 3/2010 Daily
2010/0070476 A1 3/2010 O'Keefe et al.
2010/0071048 A1 3/2010 Novak et al.
2010/0093318 A1 4/2010 Zhu et al.
2010/0103820 A1 4/2010 Fuller et al.
2010/0115236 A1 5/2010 Bataineh et al.
2010/0122091 A1 5/2010 Huang et al.
2010/0131654 A1 5/2010 Malakapalli et al.
2010/0136967 A1 6/2010 Du et al.
2010/0150154 A1 6/2010 Viger et al.
2010/0154031 A1 6/2010 Montemurro et al.
2010/0165877 A1 7/2010 Shukla et al.
2010/0177780 A1 7/2010 Ophir et al.
2010/0179984 A1 7/2010 Sebastian
2010/0188976 A1 7/2010 Rahman et al.
2010/0190492 A1 7/2010 Jiang
2010/0198646 A1 8/2010 Mikan
2010/0228814 A1 9/2010 McKenna et al.
2010/0228819 A1 9/2010 Wei
2010/0242092 A1 9/2010 Harris et al.
2010/0246602 A1 9/2010 Barreto et al.
2010/0250497 A1 9/2010 Redlich et al.
2010/0251330 A1 9/2010 Kroeselberg et al.
2010/0261479 A1 10/2010 Hidaka
2010/0274772 A1 10/2010 Samuels
2010/0278733 A1 11/2010 Karsten et al.
2010/0296402 A1* 11/2010 Fraccalvieri ............ H04L 47/10
370/252
2010/0299451 A1 11/2010 Yigang et al.
2010/0306169 A1 12/2010 Pishevar et al.
2010/0322250 A1 12/2010 Shetty et al.
2010/0325277 A1 12/2010 Muthiah et al.
2011/0040889 A1 2/2011 Garrett et al.
2011/0047620 A1 2/2011 Mahaffey et al.
2011/0055921 A1 3/2011 Narayanaswamy et al.
2011/0066718 A1 3/2011 Susai et al.
2011/0066736 A1 3/2011 Mitchell et al.
2011/0072321 A1 3/2011 Dhuse
2011/0075667 A1 3/2011 Li et al.
2011/0078303 A1 3/2011 Li et al.
2011/0098087 A1 4/2011 Tseng
2011/0107077 A1 5/2011 Henderson et al.
2011/0113095 A1 5/2011 Hatami-Hanza
2011/0116377 A1 5/2011 Batz et al.
2011/0116382 A1 5/2011 McCann
2011/0153822 A1 6/2011 Rajan et al.
2011/0154443 A1 6/2011 Thakur et al.
2011/0158090 A1 6/2011 Riley
2011/0173295 A1 7/2011 Bakke et al.
2011/0184733 A1 7/2011 Yu et al.
2011/0185082 A1 7/2011 Thompson
2011/0188415 A1 8/2011 Graziano
2011/0197059 A1 8/2011 Klein et al.
2011/0202613 A1 8/2011 Craig
2011/0202676 A1 8/2011 Craig et al.
2011/0213911 A1 9/2011 Eldus et al.
2011/0217978 A1 9/2011 Horn
2011/0246800 A1 10/2011 Accpadi et al.
2011/0273984 A1 11/2011 Hsu et al.
2011/0277016 A1 11/2011 Hockings et al.
2011/0282997 A1 11/2011 Prince et al.
2011/0314178 A1 12/2011 Kanode et al.
2011/0321122 A1 12/2011 Mwangi et al.
2012/0016994 A1 1/2012 Nakamura
2012/0030341 A1 2/2012 Jensen et al.
2012/0039262 A1 2/2012 Walsh
2012/0039341 A1 2/2012 Latif et al.
2012/0041965 A1 2/2012 Vasquez et al.
2012/0063314 A1 3/2012 Pignataro et al.
2012/0066489 A1 3/2012 Ozaki et al.
2012/0079055 A1 3/2012 Robinson
2012/0089410 A1 4/2012 Mikurak
2012/0089677 A1 4/2012 Shafran et al.
2012/0094631 A1 4/2012 Pattabiraman
2012/0101952 A1 4/2012 Raleigh et al.
2012/0117028 A1 5/2012 Gold et al.
2012/0124372 A1 5/2012 Dilley et al.
2012/0129488 A1 5/2012 Patterson et al.
2012/0150805 A1 6/2012 Pafumi et al.
2012/0166582 A1 6/2012 Binder
2012/0191847 A1 7/2012 Nas et al.
2012/0195273 A1 8/2012 Iwamura et al.
2012/0198043 A1 8/2012 Hesketh et al.
2012/0224531 A1 9/2012 Karuturi et al.
2012/0236824 A1 9/2012 McCann
2012/0236871 A1 9/2012 Wallace
2012/0254293 A1 10/2012 Winter et al.
2012/0257506 A1 10/2012 Bazlamacci et al.
2012/0258766 A1 10/2012 Cho et al.
2012/0259722 A1 10/2012 Mikurak
2012/0311153 A1 12/2012 Morgan
2012/0317266 A1 12/2012 Abbott
2013/0003106 A1 1/2013 Lowery et al.
2013/0029726 A1 1/2013 Berionne et al.
2013/0058229 A1 3/2013 Casado et al.
2013/0091002 A1 4/2013 Christie et al.
2013/0094519 A1 4/2013 Mann

(56) References Cited

U.S. PATENT DOCUMENTS

| | | | | |
|---|---|---|---|---|
| 2013/0114497 | A1 | 5/2013 | Zhang et al. | |
| 2013/0163758 | A1 | 6/2013 | Swaminathan et al. | |
| 2013/0182713 | A1 | 7/2013 | Giacomoni et al. | |
| 2013/0198322 | A1 | 8/2013 | Oran et al. | |
| 2013/0205361 | A1 | 8/2013 | Narayanaswamy et al. | |
| 2013/0238472 | A1 | 9/2013 | Fan et al. | |
| 2013/0260731 | A1 | 10/2013 | Vihtari et al. | |
| 2013/0279401 | A1 | 10/2013 | Sander et al. | |
| 2013/0336118 | A1 | 12/2013 | Shaw | |
| 2013/0336122 | A1 | 12/2013 | Baruah et al. | |
| 2013/0346549 | A1 | 12/2013 | Craig et al. | |
| 2014/0025823 | A1 | 1/2014 | Szabo et al. | |
| 2014/0040478 | A1 | 2/2014 | Hsu et al. | |
| 2014/0059678 | A1 | 2/2014 | Parker | |
| 2014/0071895 | A1 | 3/2014 | Bane et al. | |
| 2014/0095661 | A1 | 4/2014 | Knowles et al. | |
| 2014/0099945 | A1 | 4/2014 | Singh et al. | |
| 2014/0105069 | A1 | 4/2014 | Potnuru | |
| 2014/0162705 | A1 | 6/2014 | de Wit et al. | |
| 2014/0171089 | A1 | 6/2014 | Janakiraman et al. | |
| 2014/0187199 | A1 | 7/2014 | Yan et al. | |
| 2014/0269484 | A1 | 9/2014 | Dankberg et al. | |
| 2014/0286316 | A1 | 9/2014 | Park et al. | |
| 2014/0317404 | A1 | 10/2014 | Carlson et al. | |
| 2015/0058595 | A1 | 2/2015 | Gura et al. | |
| 2015/0281961 | A1 | 10/2015 | Lee | |
| 2016/0127318 | A1 | 5/2016 | Hua | |
| 2016/0142294 | A1 | 5/2016 | Mann | |
| 2016/0219015 | A1* | 7/2016 | Ruggeri | H04L 61/1511 |
| 2018/0024901 | A1* | 1/2018 | Tankersley | G06Q 10/06393 707/694 |
| 2019/0098032 | A1* | 3/2019 | Murphey | H04L 63/1425 |

FOREIGN PATENT DOCUMENTS

| | | |
|---|---|---|
| EP | 744850 | 11/1996 |
| EP | 0817040 | 1/1998 |
| EP | 1081918 | 3/2001 |
| EP | 1916797 | 4/2008 |
| EP | 2744172 | 6/2014 |
| JP | 06-205006 | 7/1994 |
| JP | 6205006 A3 | 7/1994 |
| JP | 8021924 | 3/1996 |
| JP | 2000183935 | 6/2000 |
| WO | WO 9114326 | 9/1991 |
| WO | WO 9505712 | 2/1995 |
| WO | WO 9709805 | 3/1997 |
| WO | WO 9745800 | 12/1997 |
| WO | WO 9905829 | 2/1999 |
| WO | WO 9906913 | 2/1999 |
| WO | WO 9910858 | 3/1999 |
| WO | WO 9939373 | 8/1999 |
| WO | WO 9964967 | 12/1999 |
| WO | WO 004422 | 1/2000 |
| WO | WO 004458 | 1/2000 |
| WO | WO 00/58870 | 10/2000 |
| WO | WO 02/39696 | 5/2002 |
| WO | WO 2006/091040 | 8/2006 |
| WO | WO 2011002777 | 1/2011 |

OTHER PUBLICATIONS

F5 Networks Inc., "F5 BIG-IP TMOS: Operations Guide", Manual, Mar. 5, 2016, pp. 1-236, F5 Networks, Inc., Retrieved from the Internet<https://support.f5.com/kb/en-us/products/big-ip_ltm/manuals/product/f5-tmos-operations-guide.html>.

F5 Networks Inc., "BIG-IP® Local Traffic Management: Basics", Manual, Oct. 20, 2015, pp. 1-68, vol. 12.0, F5 Networks, Inc., Retrieved from the Internet<https://support.f5.com/kb/en-us/products/big-ip_ltm/manuals/product/ltm-basics-12-0-0.html>.

F5 Networks Inc., BIG-IP LTM and TMOS 12.0.0, Release Notes, Oct. 6, 2016, pp. 1-110, vol. 12.0, F5 Networks, Inc., Retrieved from the Internet<https://support.f5.com/kb/en-us/products/big-ip_ltm/releasenotes/product/relnote-ltm-12-0-0.html>.

F5 Networks Inc., "BIG-IP® Analytics: Implementations", Manual, Oct. 27, 2015, pp. 1-50, vol. 12.0, F5 Networks, Inc., Retrieved from the Internet<https://support.f5.com/kb/en-us/products/big-ip_ltm/manuals/product/ltm-basics-12-0-0.html>.

"Diameter MBLB Support Phase 2: Generic Message Based Load Balancing (GMBLB)", last accessed Mar. 29, 2010, pp. 1-1 0, (http://peterpan.f5net.com/twiki/bin/view/TMOS/TMOSDiameterMBLB).

"EC Tackles Mobile Data Bill Shock", LightReading, May 11, 2012, (http://www.lightreading.com/document.asp?doc_id=220822&f_src=lrmobiledailynewsletter).

"Market Research & Releases, CMPP PoC documentation", last accessed Mar. 29, 2010, (http://mainstreet/sites/PD/Teams/ProdMgmt/MarketResearch/Universal).

"Market Research & Releases, Solstice Diameter Requirements", last accessed Mar. 29, 2010, (http://mainstreet/sites/PD/Teams/ProdMgmt/MarketResearch/Unisversal).

"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).

"Roaming", Digital Agenda for Europe, Jan. 9, 2014, pp. 1-4, (http://ec.europa.eu/information_society/activities/roaming/index_en.htm).

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

"UDDI Overview", Sep. 6, 2000, pp. 1-21, uddi.org, (http://www.uddi.org/).

"UDDI Technical White Paper," Sep. 6, 2000, pp. 1-12, uddi-org, (http://www.uddi.org/).

"UDDI Version 3.0.1", UDDI Spec Technical Committee Specification, Oct. 14, 2003, pp. 1-383, uddi.org, (http://www.uddi.org/).

Akkiraju, P., et al., Enabling Enterprise Multihoming with Cisco IOS Network Address Translation (NAT), White Paper, Cisco Systems, Inc., 1997, pp. 1-26.

Baer, T., et al., "The elements of Web services" ADTmag.com, Dec. 1, 2002, pp. 1-6, (http://www.adtmag.com).

Bates, T., et al., "Scalable Support for Multi-homed Multi-provider Connectivity", Network Working Group, RFC 2260, Jan. 1998, pp. 1-12.

Blue Coat, "Technology Primer: CIFS Protocol Optimization," Blue Coat Systems Inc., 2007, last accessed: Dec. 9, 2013, pp. 1-3, (http://www.bluecoat.com).

Calhoun, P., et al. "Diameter Base Protocol", Network Working Group, Standards Track, Sep. 2003, pp. 1-147.

Crescendo Networks, "Application Layer Processing (ALP)," 2003-2009, pp. 168-186, Chapter 9, CN-5000E/5500E, Foxit Software Company.

DARPA Internet Program, "Transmission Control Protocol", Protocol Specification, RFC: 793, Sep. 1981, pp. 1-82.

Dierks, T., et al., "The TLS Protocol", Network Working Group, RFC 2246, Jan. 1999, version 1.0, pp. 1-75.

F5 Networks Inc., "3-DNS® Reference Guide, version 4.5", F5 Networks Inc., Sep. 2002, pp. 2-1-2-28, 3-1-3-12, 5-1-5-24, Seattle, Washington.

F5 Networks Inc., "A Link Load Balancing Solution for Multi-Homed Networks", F5 Networks Inc., White Paper, Oct. 2004, pp. 1-6.

F5 Networks Inc., "BIG-IP® Link Controller Reference Guide", F5 Networks Inc., Manuel-0054-00, 2002, version 4.3, pp. 1-344.

F5 Networks Inc., "BIG-IP® Link Controller Solutions Guide", F5 Networks Inc., Manuel-0053-01, 2002, version 4.5, pp. 1-70.

F5 Networks Inc., "BIG-IP® Reference Guide, version 4.5", F5 Networks Inc., Sep. 2002, pp. 11-1-11-32, Seattle, Washington.

F5 Networks Inc., "Case Information Log for 'Issues with BoNY upgrade to 4.3'", as early as Feb. 2008.

F5 Networks Inc., "Configuration Guide for Local Traffic Management," F5 Networks Inc., Jan. 2006, version 9.2.2, 406 pgs.

(56) References Cited

OTHER PUBLICATIONS

F5 Networks Inc., "Deploying the BIG-IP LTM for Diameter Traffic Management," F5® Deployment Guide, Publication date Sep. 2010, Version 1.2, pp. 1-19.
F5 Networks Inc., "F5 Diameter RM", Powerpoint document, Jul. 16, 2009, pp. 1-7.
F5 Networks Inc., "F5 Signaling Delivery Controller (SDC)", F5 Networks Inc., User Guide, Feb. 2015, catalog No. RG-014-405-6 Ver.8., pp. 1-266.
F5 Networks Inc., "F5 Signaling Delivery Controller, Release Notes, 4.4 CF 4", F5 Networks Inc., RG-015-44-61, Jun. 2015, version 2, pp. 1-54.
F5 Networks Inc., "F5 Signaling Delivery Controller, SS7 Diameter Interworking Function, 4.4", F5 Networks Inc., FD-015-44-35, May 2015, version 2, pp. 1-50.
F5 Networks Inc., "F5 Signaling Delivery Controller, User Guide, 4.4", F5 Networks Inc., RG-015-44-22, Jun. 2015, version 2, pp. 1-267.
F5 Networks Inc., "F5 Signaling Delivery Controller", F5 Networks Inc., Product Description, Mar. 2014, catalog No. GD-014-405-4 Ver.2., pp. 1-90.
F5 Networks Inc., "F5 Signaling Delivery Controller™", F5 Networks Inc., Release Notes, Jul. 2015, catalog No. RG-015-405-56 Ver.1., pp. 1-119.
F5 Networks Inc., "F5 WANJet CIFS Acceleration", White Paper, F5 Networks Inc., Mar. 2006, pp. 1-5, Seattle, Washington.
F5 Networks Inc., "High availability and intelligent routing for multi-homed networks", F5 Networks Inc., BIG-IP Link Controller, 2003, pp. 1-5.
F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).
F5 Networks Inc., "Using F5's-DNS Controller to Provide High Availability Between Two or More Data Centers", F5 Networks Inc., Aug. 2001, pp. 1-4, Seattle, Washington, (http://www.f5.com/f5producs/3dns/relatedMaterials/UsingF5.html).
F5 Networks, Inc., "BIG-IP Controller with Exclusive OneConnect Content Switching Feature Provides a Breakthrough System for Maximizing Server and Network Performance," Press Release, May 8, 2001, 2 pages, Las Vegas, Nevada.
Fajardo V., "Open Diameter Software Architecture," Jun. 25, 2004, pp. 1-6, Version 1.0.7.
Fielding et al., "Hypertext Transfer Protocol—HTTP/1.1," Network Working Group, RFC: 2616, Jun. 1999, pp. 1-176.
Floyd et al., "Random Early Detection Gateways for Congestion Avoidance," Aug. 1993, pp. 1-22, IEEE/ACM Transactions on Networking, California.
Freier A., et al., "The SSL Protocol", Transport Layer Security Working Group, Nov. 18, 1996, version 3.0, pp. 1-65.
Gupta et al., "Algorithms for Packet Classification", Computer Systems Laboratory, Stanford University, CA, Mar./Apr. 2001, pp. 1-29.
Heinz II. G., "Priorities in Stream Transmission Control Protocol (SCTP) Multistreaming", Thesis submitted to the Faculty of the University of Delaware, Spring 2003, pp. 1-35.
Hochmuth, Phil, "F5, CacheFlow pump up content-delivery lines," Network World Fusion, May 4, 2001, 1 page, Las Vegas, Nevada.
Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.
International Search Report for International Patent Application No. PCT/US2012/038228 (dated Oct. 19, 2012).
International Search Report for International Patent Application No. PCT/US2013/026615 (dated Jul. 4, 2013).
Internet Protocol,"DARPA Internet Program Protocol Specification", (RFC:791), Information Sciences Institute, University of Southern California, Sep. 1981, pp. 1-49.
Kawamoto, D., "Amazon files for Web services patent", CNET News.com, Jul. 28, 2005, pp. 1-2, (http://news.com).
LaMonica M., "Infravio spiffs up Web services registry idea", CNET News.com, May 11, 2004, pp. 1-2, (http://www.news.com).
MacVittie, L., "Message-Based Load Balancing: Using F5 solutions to address the challenges of scaling Diameter, RADIUS, and message-oriented protocols", F5 Technical Brief, 2005, pp. 1-9, F5 Networks Inc., Seattle, Washington.
Meyer D., "Europe agrees on changes for cheaper roaming", ZDNet, Mar. 28, 2012, pp. 1-2, (http://www.zdnet.co.uk/news/regulation/2012/03/28/europe-agrees-on-changes-for-cheaper-roaming-40154908/).
Microsoft Corporation, "Windows Server 2003 Kerberos Extensions," Microsoft TechNet, 2003 (Updated Jul. 31, 2004), http://technet.microsoft.com/enus/library/cc738207.
Modiano E., "Scheduling Algorithms for Message Transmission Over a Satellite Broadcast System," MIT Lincoln Laboratory Advanced Network Group, Nov. 1997, pp. 1-7.
Needham J., "Link Load Balancers Smooth Web Traffic", F5 Networks Inc., Network World Fusion, Sep. 16, 2002, pp. 1, (http://www.f5.com/about/lnews/news-articles/archive/20020916).
Nichols K., et al., "Definition of the Differentiated Services Field (DS Field) in the IPv4 and IPv6 Headers", (RFC:2474) Network Working Group, Dec. 1998, pp. 1-19, (http://www.ietf.org/rfc/rfc2474.txt).
Oracle, "Oracle Communications Converged Application Server", Diameter Application Development Guide, Release 5.1, Dec. 2012.
Ott D., et al., "A Mechanism for TCP-Friendly Transport-level Protocol Coordination", USENIX Annual Technical Conference, Jun. 10, 2002, University of North Carolina at Chapel Hill, pp. 1-12.
OWASP, "Testing for Cross site scripting", OWASP Testing Guide v2, Table of Contents, Feb. 24, 2011, pp. 1-5, (www.owasp.org/index.php/Testing_for_Cross_site_scripting).
Padmanabhan V., et al., "Using Predictive Prefetching to Improve World Wide Web Latency", SIGCOM, Jul. 1, 1996, pp. 1-15.
Raghavan B., et al., "Cloud Control with Distributed Rate Limiting", SIGCOMM'07, Aug. 27-31, 2007, pp. 1-11, Department of Computer Science and Engineering, University of California, San Diego, CA.
Rosen E., et al., "MPLS Label Stack Encoding", (RFC:3032) Network Working Group, Jan. 2001, pp. 1-22, (http://www.ietf.org/rfc/rfc3032.txt).
Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.
Schilit B., "Bootstrapping Location-Enhanced Web Services", University of Washington, Dec. 4, 2003, (http:// www.cs.washington.edu/news/colloq.info.html).
Seeley R., "Can Infravio technology revive UDDI?", ADTmag.com, Oct. 22, 2003, (http://www.adtmag.com).
Shohoud, Y., "Building XML Web Services with VB .NET and VB 6", Addison Wesley, Sep. 2002, pp. 1-14.
Sleeper B., "The Evolution of UDDI", UDDI.org White Paper, the Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
Snoeren A., et al., "Managing Cloud Resources: Distributed Rate Limited", Building and Programming the Cloud Workshop, Jan. 13, 2010, pp. 1-38, UCSDCSE Computer Science and Engineering.
Sommers F., "Whats New in UDDI 3.0—Part 1", Web Services Papers, Jan. 27, 2003, pp. 1-4, (http://www.webservices.org/index.php/article/articleprint/871/-1/24/).
Sommers F., "Whats New in UDDI 3.0—Part 2", Web Services Papers, Mar. 2, 2003, pp. 1-8, (http://www.web.archive.org/web/20040620131006/).
Sommers F., "Whats New in UDDI 3.0—Part 3", Web Services Papers, Sep. 2, 2003, pp. 1-4, (http://www.webservices.org/index.php/article/articleprint/894/-1/24/).
Stuckmann P., "EU Roaming Regulation—towards structural solutions" European Commission Information Society and Media, Mar.

(56) References Cited

OTHER PUBLICATIONS 2012, pp. 1-22, (http://www.wto.org/english/tratop_e/serv_e/sym_march12_e/presentation_stuckmann.pdf).
Telekom, Austria Group., "Unbundling roaming services", Telekom, Austria Group, Feb. 2011, pp. 1-21, (http://www.google.nl/search?q=unbundling+roaming+mvno+ec&ie=UTF-8&oe=UTF-8&hl=nl&client=safari).
Traffix Systems, "Diameter Edge Agent (DEA)", Jul. 2, 2012, pp. 2-5, (http://www.traffixsystemscomsolutionsedge-routing-DEA).
Traffix Systems, "Product Brochure, Traffix Signaling Deliver Controller™ (SDC)", Mar. 2011, pp. 1-11, F5 Networks Inc.
Traffix Systems, "Signaling Deliver Controller™: Control Your 4G Network", Data Sheet, Mar. 2011, pp. 1-6, F5 Networks Inc.
Wang B., "Priority and realtime data transfer over the best-effort Internet", Dissertation Abstract,ScholarWorks@UMASS, Sep. 2005, pp. i-xiv and pp. 1-9.
Wikipedia, "Diameter (protocol)", pp. 1-11, last accessed Oct. 27, 2010, (http://en.wikipedia.org/wiki/Diameter_(protocol)).
Williams et al., "The Ultimate Windows Server 2003 System Administrator's Guide: Forwarding Authentication," 2003, 2 pages, Figure 10.7, Addison-Wesley Professional, Boston, Massachusetts.
Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?amumber=832499).

* cited by examiner

```
when HTTP_REQUEST {
      if [IP::addr [IP::client_addr]/8 equals 10.0.0.0] {
          # make stats queryable by URI
          TCP::analytics key "[HTTP::uri]"
      }
}
```

FIG. 4

METHODS FOR FACILITATING NETWORK TRAFFIC ANALYTICS AND DEVICES THEREOF

This application claims the benefit of U.S. Provisional Patent Application Ser. No. 62/416,214 filed Nov. 2, 2016, which is hereby incorporated by reference in its entirety.

FIELD

This technology generally relates to facilitating improved network traffic analytics.

BACKGROUND

Many networks include one or more network traffic management apparatuses that perform any number of functions relating to load balancing, network security, and/or application acceleration, for example. In one particular exemplary implementation, a network traffic management apparatus may be disposed proximate server devices in a network in order to optimize and accelerate communications between client devices and applications hosted by the server devices.

In order to facilitate monitoring and effective configuration and operation, network traffic management apparatuses can maintain statistics in application visibility and reporting (AVR) databases, for example. In one particular example, network traffic management apparatuses can maintain transmission control protocol (TCP) statistics indexed based on entities (e.g., virtual servers, IP addresses, and/or next hop address) that are visible at the transport layer to facilitate TCP analytics. Accordingly, administrators can query the AVR database for any combination of entity values to retrieve statistics for a subset of TCP connections.

In this example, higher layers (e.g., application, presentation, and session layers) may have more relevant information regarding the purpose and relevance of TCP connections. More generally, the statistics that could benefit from relevant information associated with a first layer can be associated with a second layer that is higher or lower than the first layer. Accordingly, queries in an AVR database for TCP analytics, for example, are currently limited to the entities that are visible at the transport layer or below, rendering interpretation, analysis, and classification of TCP statistics difficult for administrators.

SUMMARY

A method for facilitating improved network traffic analytics implemented by a network traffic management system comprising one or more network traffic management apparatuses, administrator device, client devices, or server devices, the method including determining when an event has occurred. The event is defined in an obtained rule and is associated in the rule with a key. The key is attached to a connection associated with received network traffic that triggered the event when the determining indicates that the event has occurred. The connection is associated with a first layer which is different from a second layer. The key comprises an input string value or corresponds to a portion of data associated with a second layer associated with the network traffic. The connection is then monitored to obtain statistics for the connection and store or report the statistics as associated with the key.

A network traffic management apparatus, comprising memory comprising programmed instructions stored thereon and one or more processors configured to be capable of executing the stored programmed instructions to determine when an event has occurred. The event is defined in an obtained rule and is associated in the rule with a key. The key is attached to a connection associated with received network traffic that triggered the event, when the determining indicates that the event has occurred. The connection is associated with a first layer which is different from a second layer. The key comprises an input string value or corresponds to a portion of data associated with a second layer associated with the network traffic. The connection is then monitored to obtain statistics for the connection and store or report the statistics as associated with the key.

A non-transitory computer readable medium having stored thereon instructions for facilitating improved network traffic analytics comprising executable code which when executed by one or more processors, causes the processors to determine when an event has occurred. The event is defined in an obtained rule and is associated in the rule with a key. The key is attached to a connection associated with received network traffic that triggered the event, when the determining indicates that the event has occurred. The connection is associated with a first layer which is different from a second layer. The key comprises an input string value or corresponds to a portion of data associated with a second layer associated with the network traffic. The connection is then monitored to obtain statistics for the connection and store or report the statistics as associated with the key.

A network traffic management system, comprising one or more network traffic management apparatuses, administrator devices, client devices, or server devices, the network traffic management system comprising memory comprising programmed instructions stored thereon and one or more processors configured to be capable of executing the stored programmed instructions to determine when an event has occurred. The event is defined in an obtained rule and is associated in the rule with a key. The key is attached to a connection associated with received network traffic that triggered the event, when the determining indicates that the event has occurred. The connection is associated with a first layer which is different from a second layer. The key comprises an input string value or corresponds to a portion of data associated with a second layer associated with the network traffic. The connection is then monitored to obtain statistics for the connection and store or report the statistics as associated with the key.

This technology has a number of associated advantages including providing methods, non-transitory computer readable media, network traffic management apparatuses, and network traffic management systems that more effectively obtain network traffic analytics. For example, with this technology TCP statistics can advantageously be indexed based on strings corresponding to HTTP or other application layer data which is not available at the transport layer. As a result, network administrators can obtain statistics based on data associated with different layers and protocols, thereby facilitating improved network analytics and associated network traffic management device operation.

BRIEF DESCRIPTION OF THE DRAWINGS

FIG. 4 is an exemplary rule defining an event and key; and

DETAILED DESCRIPTION

Figure 1:
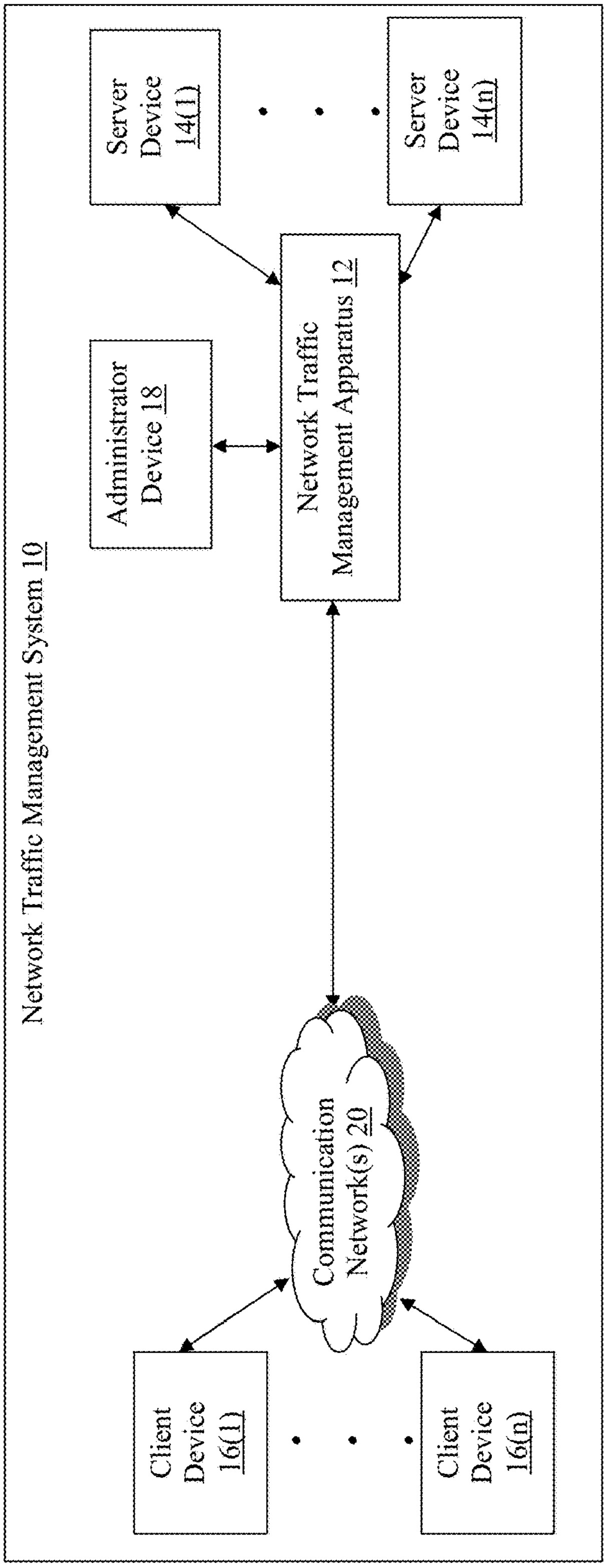
FIG. 1 is a block diagram of an exemplary network traffic management system with an network traffic management apparatus.

Referring to FIG. 1, an exemplary network environment which incorporates an exemplary network traffic management system 10 is illustrated. The network traffic management system 10 in this example includes a network traffic management apparatus 12 that is coupled to a plurality of server devices 14(1)-14(*n*), a plurality of client devices 16(1)-16(*n*), and an administrator device 18 via communication network(s) 20, although the network traffic management apparatus 12, server devices 14(1)-14(*n*), client devices 16(1)-16(*n*), and/or administrator device 18 may be coupled together via other topologies. Additionally, the network traffic management system 10 may include other network devices such as one or more routers and/or switches, for example, which are well known in the art and thus will not be described herein. This technology provides a number of advantages including methods, non-transitory computer readable media, network traffic management systems, and network traffic management apparatuses that facilitate classifying and indexing statistics associated with a first layer using data associated with a second layer and/or user-defined strings.

Figure 2:
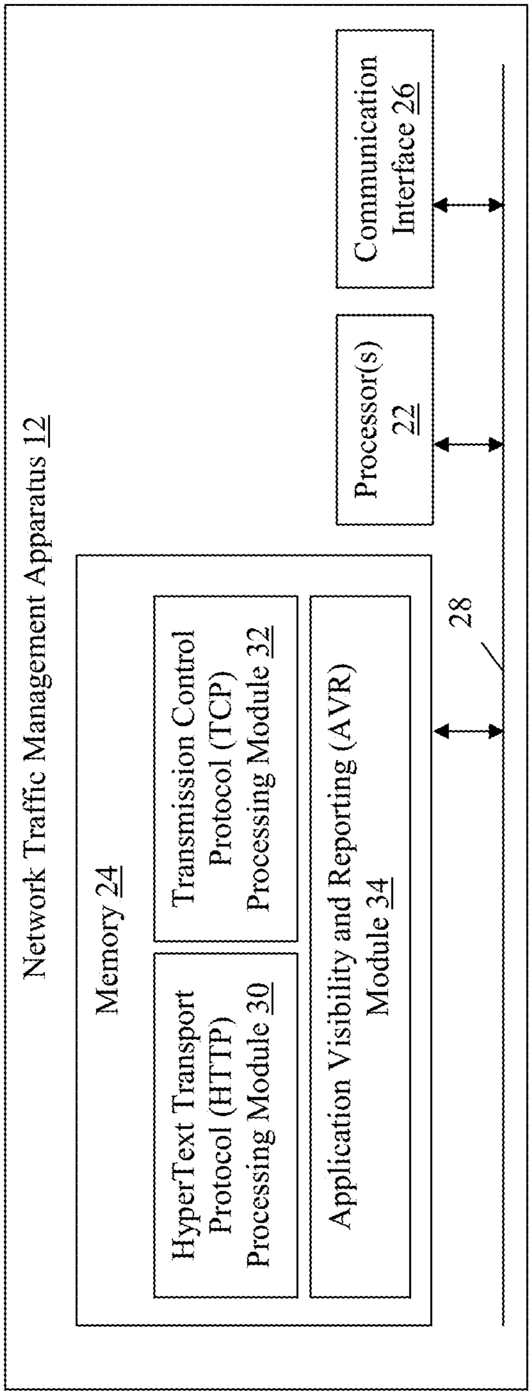
FIG. 2 is a block diagram of an exemplary network traffic management apparatus.

Referring to FIGS. 1-2, the network traffic management apparatus 12 of the network traffic management system 10 may perform any number of functions including managing network traffic, load balancing network traffic across the server devices 14(1)-14(*n*), accelerating network traffic associated with web applications hosted by the server devices 14(1)-14(*n*), and/or providing firewall and other security services on behalf of the server devices 14(1)-14(*n*) and applications hosted thereon.

The network traffic management apparatus 12 includes one or more processors 22, a memory 24, and/or a communication interface 26, which are coupled together by a bus 28 or other communication link, although the network traffic management apparatus 12 can include other types and/or numbers of elements in other configurations.

The processor(s) 22 of the network traffic management apparatus 12 may execute programmed instructions stored in the memory 24 of the network traffic management apparatus 12 for the any number of the functions identified above. The processor(s) 22 of the network traffic management apparatus 12 may include one or more CPUs or general purpose processors with one or more processing cores, for example, although other types of processor(s) can also be used.

The memory 24 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 22, can be used for the memory 24.

Figure 3:
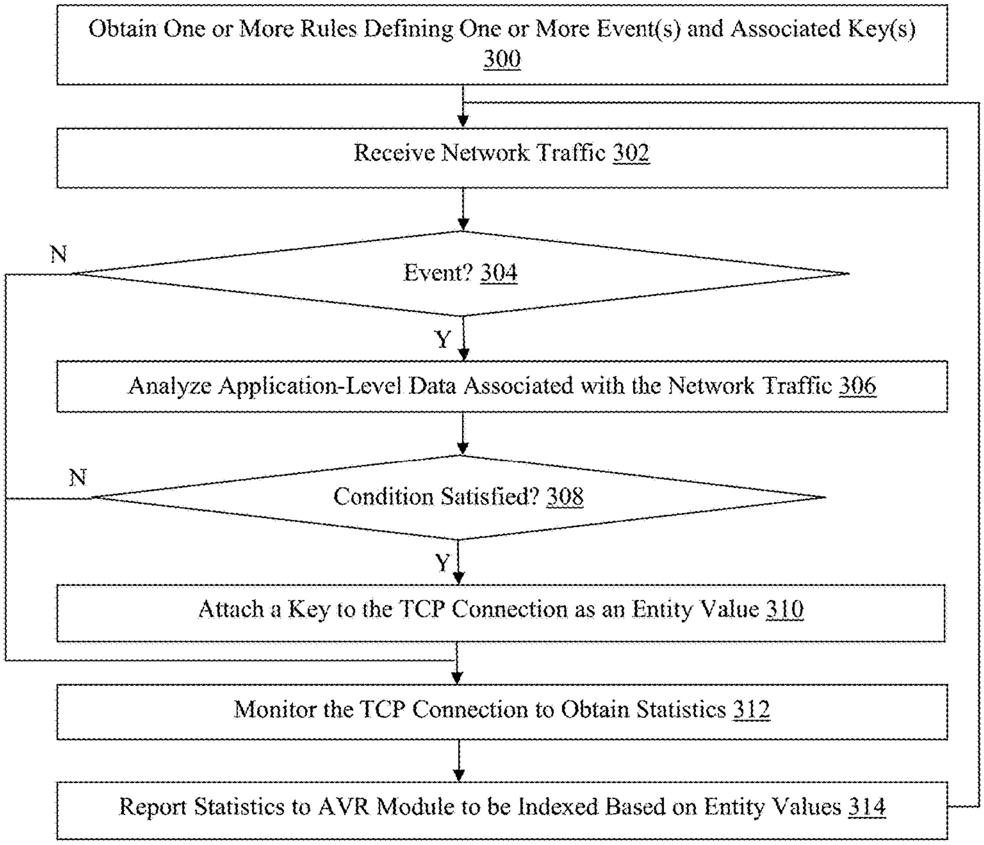
FIG. 3 is a flowchart of an exemplary method for classifying and indexing Transmission Control Protocol (TCP) statistics.

Accordingly, the memory 24 of the network traffic management apparatus 12 can store one or more applications that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 3-5. The application(s) can be implemented as modules or components of other applications. Further, the application(s) can be implemented as operating system extensions, modules, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application(s) may be running in one or more virtual machines (VMs) executing on the network traffic management apparatus 12. Additionally, in one or more embodiments of this technology, virtual machine(s) running on the network traffic management apparatus 12 may be managed or supervised by a hypervisor.

In this particular example, the memory 24 of the network traffic management apparatus 12 includes a hypertext transport protocol (HTTP) processing module, a TCP processing module, and an application visibility and reporting (AVR) module, although the memory 24 can include other policies, modules, databases, or applications, for example. The HTTP processing module 30 can be any type of module that has visibility to HTTP data.

Accordingly, the HTTP processing module 30 can process HTTP network traffic, for example. In one particular example, the HTTP processing module 30 can be a policy enforcement manager (PEM) configured to apply policies to network traffic originating from mobile ones of the client devices 16(1)-16(*n*) that are in a subscriber network, although the HTTP processing module 30 can be any other type of module in other examples. The HTTP processing module 30 is further configured to evaluate rules to determine whether an event has occurred and an associated key should be attached to a TCP connection associated with received network traffic that triggered the event, as described and illustrated in more detail later.

The TCP processing module 32 is configured to manage TCP connections and has visibility to entities associated with the transport layer in the OSI model, such as virtual server, remote host IP address/subnet, next hop address, and/or geolocation code data, for example. The TCP processing module 32 is configured to monitor TCP traffic and provide statistical data to the AVR module 34 based on the various entities for one or more TCP connections. The TCP processing module 32 in this example is further configured to attach keys to TCP connections at the instruction of the HTTP processing module 30, and report the keys as entity values for particular TCP connections to the AVR module 34, also as described and illustrated in more detail later. The HTTP processing module 30 and TCP processing module 32 are exemplary only, and other modules associated with different protocols and/or layers of the OSI model can also be used in other examples.

The AVR module 34 aggregates and/or stores the statistical data received from the TCP processing module 32 in an AVR database or other data structure, for example. The statistical data is stored in format that is indexed by entity, as well as by key when a key is attached to a TCP connection for which statistical data is maintained by the AVR module 34. Accordingly, a user of the administrator device 18 can query the AVR database via an interface provided by the AVR module 34, using one or more entity values (e.g., a key), in order to retrieve statistical data for TCP connections corresponding to the entity values.

The communication interface 26 of the network traffic management apparatus 12 operatively couples and communicates between the network traffic management apparatus 12, the server devices **14(1)-14(*n*), the client devices 16(1)-16(*n*), and/or the administrator device 18, which are all coupled together by the communication network(s) 20**, although other types and/or numbers of communication networks or systems with other types and/or numbers of connections and/or configurations to other devices and/or elements can also be used.

By way of example only, the communication network(s) 20 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 20 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 20 can also include direct connection(s) (e.g., for when a device illustrated in FIG. 1, such as the network traffic management apparatus 12, one or more of the client devices **16(1)-16(*n*), one or more of the server devices 14(1)-14(*n*), or the administrator device 18** operate as virtual instances on the same physical machine).

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 12.

Additionally, one or more of the devices that together comprise the network traffic management apparatus 12 in other examples can be standalone devices or integrated with one or more other devices or apparatuses, such as one of the server devices **14(1)-14(*n*), for example. Moreover, one or more of the devices of the network traffic management apparatus 12** in these examples can be in a same or a different communication network including one or more public, private, or cloud networks, for example.

Each of the server devices **14(1)-14(*n*) of the network traffic management system 10 in this example includes one or more processors, a memory, and a communication interface, which are coupled together by a bus or other communication link, although other numbers and/or types of network devices could be used. The server devices 14(1)-14(*n*) in this example process requests received from the client devices 16(1)-16(*n*) via the communication network(s) 20 according to the HTTP-based application RFC protocol, for example. Various applications may be operating on the server devices 14(1)-14(*n*) and transmitting data (e.g., files or Web pages) to the client devices 16(1)-16(*n*) via the network traffic management apparatus 12 in response to requests from the client devices 16(1)-16(*n*). The server devices 14(1)-14(*n*)** may be hardware or software or may represent a system with multiple servers in a pool, which may include internal or external networks.

Although the server devices **14(1)-14(*n*) are illustrated as single devices, one or more actions of each of the server devices 14(1)-14(*n*) may be distributed across one or more distinct network computing devices that together comprise one or more of the server devices 14(1)-14(*n*). Moreover, the server devices 14(1)-14(*n*) are not limited to a particular configuration. Thus, the server devices 14(1)-14(*n*) may contain a plurality of network computing devices that operate using a master/slave approach, whereby one of the network computing devices of the server devices 14(1)-14(*n*) operate to manage and/or otherwise coordinate operations of the other network computing devices. The server devices 14(1)-14(*n*)** may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices **14(1)-14(*n*) can operate within the network traffic management apparatus 12 itself rather than as a stand-alone server device communicating with the network traffic management apparatus 12 via the communication network(s) 20. In this example, the one or more server devices 14(1)-14(*n*) operate within the memory 24 of the network traffic management apparatus 12**.

The client devices **16(1)-16(*n*) of the network traffic management system 10 in this example include any type of computing device that can request and receive content stored by the server devices 14(1)-14(*n*) over the communication network(s) 20, such as mobile computing devices, desktop computing devices, laptop computing devices, tablet computing devices, virtual machines (including cloud-based computers), or the like. Each of the client devices 16(1)-16(*n*)** in this example include a processor, a memory, and a communication interface, which are coupled together by a bus or other communication link, although other numbers and/or types of network devices could be used.

The client devices **16(1)-16(*n*) may run interface applications, such as standard web browsers or standalone client applications, which may provide an interface to make requests for, and receive content stored on, one or more of the server devices via the communication network(s) 20. The client devices 16(1)-16(*n*)** may further include a display device, such as a display screen or touchscreen, and/or an input device, such as a keyboard for example.

The administrator device 18 in this example includes a processor, a memory, and a communication interface, which are coupled together by a bus or other communication link, although other numbers and types of network devices could be used. The administrator device 18 may also include an input device and a display device and may run interface applications, such as a web browser, that may provide an interface for an administrator to input rules that defined events and associated keys, as well as, optionally, one or more conditions. The web browser of the administrator device 18 further provides an interface for an administrator to query an AVR database maintained by the AVR module 34 based on entity values, including keys when attached to particular TCP connections.

Although the exemplary network traffic management system 10 with the network traffic management apparatus 12, server devices **14(1)-14(*n*), client devices 16(1)-16(*n*), administrator device 18, and communication network(s) 20** are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the network traffic management apparatus 12, client devices **16(1)-16(*n*), server devices 14(1)-14(*n*), or administrator device 18, for example, may be configured to operate as virtual instances on the same physical machine. In other words, one or more of the network traffic management apparatus 12, client devices 16(1)-16(*n*), server devices 14(1)-14(*n*), or administrator device 18 may operate on the same physical device rather than as separate devices communicating through communication network(s). Additionally, there may be more or fewer network traffic management apparatuses, client devices, server devices, or administrator devices than illustrated in FIG. 1. The client devices 16(1)-16(*n*) could also be implemented as applications on the network traffic management apparatus 12** itself as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of facilitating network traffic analytics will now be described with reference to FIGS. 1-5. Referring more specifically to FIG. 3, an example of a method for classifying and indexing TCP statistics is illustrated. In step 300 in this example, the network traffic management apparatus 12 of the network traffic management system 10 obtains one or more rules that define one or more events and associated keys, and optionally one or more conditions, from the administrator device 18, although the events, keys, and conditions can be obtained in other ways.

The rules can be stored and evaluated by the HTTP processing module 30 and are optionally event-driven. In one particular example, the rules can be based on cross-layer messaging protocol or framework, such as iRules provided by F5 Networks, Inc. of Seattle, Wash., which is based on the Tool Command Language (TCL), although other types of rules can also be used in other examples. The optional conditions can be evaluated by the HTTP processing module 30 based on HTTP data, for example.

Accordingly, upon determining an event has occurred, the HTTP processing module 30 evaluates any conditions associated with the event that has occurred. If one or more of the conditions are satisfied, the HTTP processing module 30 instructs the TCP processing module 32 to attach a key associated with the event and/or satisfied condition(s) to a TCP connection associated with network traffic that triggered the event, as described and illustrated in more detail later.

The key can be obtained from the administrator device 18 and stored as associated with one or more of the events and/or conditions as a predefined input string value. In another example, the key corresponds to at least a portion of HTTP data (e.g., a Uniform Resource Identifier (URI)) associated with network traffic that triggered an event, although other types and/or numbers of keys can be used in other examples.

In step 302, the network traffic management apparatus 12 receives network traffic, such as from one of the client devices **16(1)-16(*n*), for example. The network traffic can be HTTP traffic directed to an application hosted by one of the server devices 14(1)-14(*n*), for example, although other types of network traffic can also be received in step 302. Additionally, the network traffic can be received by the HTTP processing module 30 storing the rules obtained in step 300**.

In step 304, the network traffic management apparatus 12 optionally determines whether an event in one of the rules obtained in step 300 has occurred. The event can be receipt of an HTTP or initiation of an SSL connection, for example, although other types of events can also be defined in the rules evaluated in step 304. If the network traffic management apparatus 12 determines that an event has occurred, then the Yes branch is taken to step 306.

In step 306, the network traffic management apparatus 12 optionally analyzes HTTP data associated with the network traffic based on one or more conditions associated with the event determined to have occurred in step 304. The HTTP data can include PEM value(s), a user agent, an operating system, an HTTP identifier, a tower ID, or any other number or type of data that is visible at the application, presentation, or session layer, for example.

In step 308, the network traffic management apparatus 12 determines whether at least one of the conditions is satisfied based on the analysis of the HTTP data in step 306. In one example, the condition can require the network traffic management apparatus 12 to determine whether the network traffic is associated with a particular URI. In this example, rather than a key being attached to a TCP connection each time an HTTP request is received, a key is only attached to a TCP connection associated with HTTP requests for a particular URI.

Accordingly, the conditions effectively narrow the scope of the attachment of the keys to particular TCP connections based on HTTP data in this example. The conditions can be associated with any other type of HTTP data, and other types of conditions can also be used. If the network traffic management apparatus 12 determines that one of the conditions in one of the rules associated with the event determined to have occurred in step 304 is satisfied, then the Yes branch is taken from step 308 to step 310.

In step 310, the network traffic management apparatus 12 attaches a key associated with the event determined to have occurred in step 304, and/or conditions determined to have been satisfied in step 308, to a TCP connection associated with the network traffic that triggered the event. The key is communicated by the HTTP processing module 30 to the TCP processing module 32, which stores and uses the key as an entity value for the TCP connection.

Referring more specifically to FIG. 4, an exemplary rule that can be obtained in step 300, and applied as described and illustrated with reference to steps 304-310, is illustrated. In this example, the rule is configured to communicate across layers. In particular, the rule determines whether an event of receipt of an HTTP request has occurred. A condition is then tested as part of the rule and, if satisfied, a URI included in the HTTP request that triggered the event is communicated as a key to the TCP processing module 32. The TCP processing module 32 attaches or associates the key with a TCP connection associated with the received HTTP request that triggered the event.

Referring back to FIG. 3, subsequent to attaching the key to the TCP connection or if the network traffic management apparatus 12 determines that an event defined in one of the rules has not occurred and the No branch is taken from step 304, or that a condition optionally defined in one of the rules associated with a triggered event has not been satisfied and the No branch is taken from step 308, then the network traffic management apparatus 12 proceeds to step 312. In step 312, the network traffic management apparatus 12 monitors the TCP connection to obtain statistics. The statistics can relate to various aspects of TCP performance for the TCP connection, such as connection time, for example.

In step 314, the network traffic management apparatus 12 reports the statistics to the AVR module 34 to be indexed based on entity values. In iterations in which a key is attached to the TCP connection in step 310, the key is treated as an entity value and, accordingly, the reported statistics are indexed based on the key along with values for one or more predefined entities (e.g., virtual server or next hop address).

However, in iterations in which a key is not attached to the TCP connection in step 310, the reported statistics are indexed based only on values for one or more predefined entities. Subsequent to reporting the statistics to the AVR module 34, the network traffic management apparatus 12 proceeds back to step 302 and receives additional network traffic. Accordingly, throughout any number of iterations, a key can be updated for a TCP connection any number of times during the collection of statistics for the TCP connection. Additionally, one or more of steps 302-316 can occur in parallel for any amount of received network traffic or any number of TCP connections.

Figure 5:
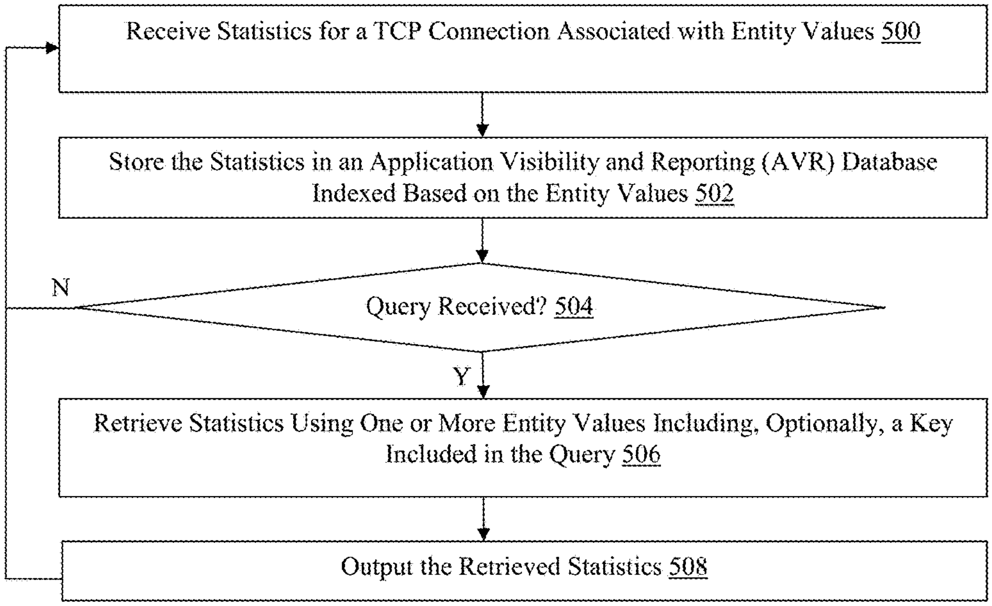
FIG. 5 is a flowchart of an exemplary method for storing and providing TCP statistics to facilitate TCP analytics.

Referring more specifically to FIG. 5, a method for storing and providing TCP statistics to facilitate TCP analytics is illustrated. In step 500 in this example, the network traffic management apparatus 12 receives statistics for a TCP connection. The TCP statistics are associated with entity values and can be received by the AVR module 34, as reported to the AVR module 34 from the TCP processing module 32, such as described and illustrated earlier with reference to step 314 of FIG. 3, for example.

In step 502, the network traffic management apparatus 12 stores the statistics in an AVR database or other data structure of the AVR module 34. Optionally, the received and stored TCP statistics can be aggregated or otherwise processed. Additionally, the statistics can be stored as associated with entity values that include a key, which could have been attached to the TCP connection, as described and illustrated in more detail earlier with reference to step 310 of FIG. 3, for example.

In step 504, the network traffic management apparatus 12 determines whether a query has been received, such as from the administrator device 18 and at the AVR module 34, for example. The query can be for TCP statistics for one or more TCP connections, and can allow an administrator to evaluate and/or improve or optimize TCP performance for the network traffic management apparatus 12, for example. If the network traffic management apparatus 12 determines that a query has not been received, then the No branch is taken back to step 500, and the network traffic management apparatus 12 continues receiving statistics for TCP connections.

However, if the network traffic management apparatus 12 determines in step 504 that a query has been received, then the Yes branch is taken to step 506. In step 506, the network traffic management apparatus 12 retrieves statistics from the AVR database using one or more entity values included in the received query. In iterations in which the query includes a key, the statistics can be retrieved using the key that was previously attached to one or more TCP connections and stored in the AVR database or other data storage structure utilized by the AVR module 34.

In step 508, the network traffic management apparatus 12 outputs the statistics retrieved in step 506, such as via one or more graphical displays sent to the administrator device 18, for example. In the example described and illustrated with reference to FIG. 4, an administrator of the network traffic management apparatus 12 can obtain overall connection time separated by URI, for example, which allows for more meaningful analysis. One or more of steps 500-508 can occur in parallel, and the receipt of a query is time-independent of the receipt of statistics for any number of TCP connections.

Accordingly, with this technology, TCP statistics can advantageously be indexed based on strings corresponding to HTTP data that is not available at the transport layer. By attaching predefined input string values to TCP connections, or effectively tagging TCP connections with strings corresponding to HTTP data, administrators can obtain TCP statistics based on higher layer values, thereby facilitating improved TCP analytics and associated network traffic management apparatus operation.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for facilitating improved network traffic analytics implemented by a network traffic management system comprising one or more network traffic management apparatuses, client devices, administrator devices, or server devices, the method comprising:

determining when an event has occurred, wherein the event is defined in a rule comprising one or more conditions and the event is associated with a key;

determining when data associated with a first network layer within network traffic satisfies at least one of the conditions in the rule;

associating the key to a connection associated with the network traffic that triggered the event, wherein the connection is associated with a second network layer within the network traffic that is different from the first network layer within the network traffic and the key comprises an input string value or corresponds to a portion of the data associated with the first network layer; and monitoring the connection to obtain statistics for the connection and storing or reporting the statistics as associated with the key.

2. The method of claim 1, further comprising storing or reporting the statistics indexed based on one or more predefined entities, when the determining indicates that the event has not occurred or the data does not satisfy the at least one of the conditions.

3. The method of claim 1, further comprising:

storing the statistics associated with the key in a database;

receiving a query comprising the key;

retrieving at least a portion of the statistics from the database using the key; and outputting the at least a portion of the statistics in response to the received query.

4. The method of claim 1, wherein the first network layer is a transport layer, the connection is a transport control protocol (TCP) connection, the second network layer is an application layer, and the rule is event-driven and implemented according to a cross-layer messaging protocol.

5. A network traffic management apparatus, comprising memory comprising programmed instructions stored thereon and one or more processors configured to be capable of executing the stored programmed instructions to:

determine when an event has occurred, wherein the event is defined in a rule comprising one or more conditions and the event is associated with a key;

determine when data associated with a first network layer within network traffic satisfies at least one of the conditions in the rule;

associate the key to a connection associated with the network traffic that triggered the event, wherein the connection is associated with a second network layer within the network traffic that is different from the first network layer within the network traffic and the key comprises an input string value or corresponds to a portion of the data associated with the first network layer; and monitor the connection to obtain statistics for the connection and store or report the statistics as associated with the key.

6. The network traffic management apparatus of claim 5, wherein the one or more processors are further configured to be capable of executing the stored programmed instructions to store or report the statistics indexed based on one or more predefined entities, when the determining indicates that the event has not occurred or the data does not satisfy the at least one of the conditions.

7. The network traffic management apparatus of claim 5, wherein the one or more processors are further configured to be capable of executing the stored programmed instructions to:

store the statistics associated with the key in a database;

receive a query comprising the key;

retrieve at least a portion of the statistics from the database using the key; and output the at least a portion of the statistics in response to the received query.

8. The network traffic management apparatus of claim 5, wherein the first network layer is a transport layer, the connection is a transport control protocol (TCP) connection, the second network layer is an application layer, and the rule is event-driven and implemented according to a cross-layer messaging protocol.

9. A non-transitory computer readable medium having stored thereon instructions for facilitating network traffic analytics comprising executable code which when executed by one or more processors, causes the one or more processors to:

determine when an event has occurred, wherein the event is defined in a rule comprising one or more conditions and the event is associated with a key;

determine when data associated with a first network layer within network traffic satisfies at least one of the conditions in the rule;

associate the key to a connection associated with the network traffic that triggered the event, wherein the connection is associated with a second network layer within the network traffic that is different from the first network layer within the network traffic and the key comprises an input string value or corresponds to a portion of the data associated with the first network layer; and monitor the connection to obtain statistics for the connection and store or report the statistics as associated with the key.

10. The non-transitory computer readable medium of claim 9, wherein the executable code when executed by the one or more processors further causes the one or more processors to store or report the statistics indexed based on one or more predefined entities, when the determining indicates that the event has not occurred or the data does not satisfy the at least one of the conditions.

11. The non-transitory computer readable medium of claim 9, wherein the executable code when executed by the one or more processors further causes the one or more processors to:

store the statistics associated with the key in a database;

receive a query comprising the key;

retrieve at least a portion of the statistics from the database using the key; and output the at least a portion of the statistics in response to the received query.

12. The non-transitory computer readable medium of claim 9, wherein the first network layer is a transport layer, the connection is a transport control protocol (TCP) connection, the second network layer is an application layer, and the rule is event-driven and implemented according to a cross-layer messaging protocol.

13. A network traffic management system, comprising one or more traffic management apparatuses, client devices, administrator devices, or server devices, the network traffic management system comprising memory comprising programmed instructions stored thereon and one or more processors configured to be capable of executing the stored programmed instructions to:

determine when an event has occurred, wherein the event is defined in a rule comprising one or more conditions and the event is associated with a key;

determine when data associated with a first network layer within network traffic satisfies at least one of the conditions in the rule;

associate the key to a connection associated with the network traffic that triggered the event, wherein the connection is associated with a second network layer within the network traffic that is different from the first network layer within the network traffic and the key comprises an input string value or corresponds to a portion of the data associated with the first network layer; and monitor the connection to obtain statistics for the connection and store or report the statistics as associated with the key.

14. The network traffic management system of claim 13, wherein the one or more processors are further configured to be capable of executing the stored programmed instructions to store or report the statistics indexed based on one or more predefined entities, when the determining indicates that the event has not occurred or the data does not satisfy the at least one of the conditions.

15. The network traffic management system of claim 13, wherein the one or more processors are further configured to be capable of executing the stored programmed instructions to:

store the statistics associated with the key in a database;

receive a query comprising the key;

retrieve at least a portion of the statistics from the database using the key; and output the at least a portion of the statistics in response to the received query.

16. The network traffic management system of claim 13, wherein the first network layer is a transport layer, the connection is a transport control protocol (TCP) connection, the second network layer is an application layer, and the rule is event-driven and implemented according to a cross-layer messaging protocol.

* * * * *